United States Patent
Prudhomme et al.

(10) Patent No.: US 12,078,249 B2
(45) Date of Patent: Sep. 3, 2024

(54) PISTON SEALING RING ASSEMBLY HAVING A GAP COVER ELEMENT

(71) Applicant: Mainspring Energy, Inc., Menlo Park, CA (US)

(72) Inventors: Jodie Prudhomme, San Francisco, CA (US); Matt Svrcek, Redwood City, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

(21) Appl. No.: 18/230,893

(22) Filed: Aug. 7, 2023

(65) Prior Publication Data

US 2023/0375086 A1 Nov. 23, 2023

Related U.S. Application Data

(63) Continuation of application No. 17/226,566, filed on Apr. 9, 2021, now Pat. No. 11,767,915, which is a continuation of application No. 16/100,017, filed on Aug. 9, 2018, now Pat. No. 10,975,966.

(60) Provisional application No. 62/543,296, filed on Aug. 9, 2017, provisional application No. 62/543,299, filed on Aug. 9, 2017.

(51) Int. Cl.
| | |
|---|---|
| *F16J 9/06* | (2006.01) |
| *F16J 9/10* | (2006.01) |
| *F16J 9/18* | (2006.01) |
| *F16J 9/26* | (2006.01) |
| *F16J 15/56* | (2006.01) |

(52) U.S. Cl.
CPC . *F16J 9/06* (2013.01); *F16J 9/10* (2013.01); *F16J 9/18* (2013.01); *F16J 9/26* (2013.01); *F16J 15/56* (2013.01)

(58) Field of Classification Search
CPC . F16J 9/06; F16J 9/10; F16J 9/12; F16J 9/18; F16J 9/26; F16J 9/28; F16J 15/56
See application file for complete search history.

(56) References Cited

U.S. PATENT DOCUMENTS

| | | | |
|---|---|---|---|
| 129 | A | 2/1837 | Morison |
| 305 | A | 7/1837 | Winans |
| 430 | A | 10/1837 | Dreyer |
| 965 | A | 10/1838 | Howlet |

(Continued)

FOREIGN PATENT DOCUMENTS

| | | |
|---|---|---|
| CH | 095881 A | 8/1922 |
| DE | 3024898 A1 | 1/1982 |

(Continued)

*Primary Examiner* — Nicholas L Foster
(74) *Attorney, Agent, or Firm* — HALEY GUILIANO LLP

(57) ABSTRACT

The present disclosure provides a sealing ring assembly having ring segments configured to seal a high-pressure region from a lower pressure region of a piston and cylinder device. The sing segments are configured to move radially outward and wear during operation of the piston via the cylinder device. The ring segments include, for example, wedge-shaped features that engage with corresponding wedge recesses in the interfaces between ring segments. The sealing ring assembly may include a high-pressure boundary and a low-pressure boundary. As the sealing ring wears, the ring segments stay engaged with the interfaces, so that ring gaps do not form on the low pressure boundary.

24 Claims, 11 Drawing Sheets

(56) References Cited

U.S. PATENT DOCUMENTS

| | | |
|---|---|---|
| 111,997 A | 2/1871 | Wells |
| 588,681 A | 8/1897 | Leary |
| 920,950 A | 5/1909 | Harkins |
| 965,355 A | 7/1910 | Robert |
| 1,251,630 A | 1/1918 | Bandum |
| 1,494,004 A | 5/1924 | Mallory |
| 1,637,987 A | 8/1927 | Dunbar |
| 1,970,892 A | 8/1934 | Kirn |
| 2,191,265 A | 2/1940 | Wheeler |
| 2,696,414 A | 12/1954 | Green |
| 2,895,774 A | 7/1959 | Doperalkski |
| 2,925,306 A | 2/1960 | Kodra |
| 3,203,705 A | 8/1965 | Doperalski |
| 3,315,968 A | 4/1967 | Hanlon |
| 3,462,159 A | 8/1969 | Baumann |
| 4,185,842 A | 1/1980 | Magara |
| 4,350,349 A | 9/1982 | Robertson, Jr. |
| 4,455,974 A | 6/1984 | Shapiro |
| 4,516,481 A | 5/1985 | Geffroy et al. |
| 4,516,785 A | 5/1985 | Miller |
| 4,579,349 A | 4/1986 | Pipich |
| 5,403,019 A | 4/1995 | Marshall |
| 6,045,135 A | 4/2000 | Feistel |
| 6,193,236 B1 | 2/2001 | Helpap |
| 6,322,080 B1 | 11/2001 | Feistel |
| 6,378,872 B1 | 4/2002 | Moriarty |
| 6,457,722 B1 | 10/2002 | Feistel |
| 6,715,766 B2 | 4/2004 | Kirby |
| 8,430,628 B2 | 4/2013 | Turnquist |
| 8,807,571 B2 | 8/2014 | Chalk |
| 9,909,438 B2 | 3/2018 | Duffy |
| 10,436,322 B2 | 10/2019 | Svrcek |
| 10,443,727 B2 * | 10/2019 | Svrcek ................. F16F 9/368 |
| 10,975,966 B2 * | 4/2021 | Prudhomme .......... F16J 15/188 |
| 11,346,445 B2 * | 5/2022 | Svrcek ...................... F16J 9/16 |
| 11,767,915 B2 * | 9/2023 | Prudhomme ............ F16J 15/24 |
| | | 277/482 |
| 2003/0006562 A1 | 1/2003 | Feistel |
| 2005/0051970 A1 | 3/2005 | Edelmann |
| 2007/0137957 A1 | 6/2007 | Carlstedt |
| 2008/0289491 A1 | 11/2008 | May |
| 2010/0201076 A1 | 8/2010 | Hold |
| 2014/0090554 A1 | 4/2014 | Chalk |
| 2015/0061230 A1 | 3/2015 | Mina |
| 2018/0156208 A1 | 6/2018 | Mahieux |
| 2021/0388901 A1 * | 12/2021 | Prudhomme ........... B23P 15/08 |
| 2022/0356948 A1 * | 11/2022 | Svrcek ...................... F16J 9/16 |
| 2023/0375086 A1 * | 11/2023 | Prudhomme ........... B23P 15/08 |

FOREIGN PATENT DOCUMENTS

| | | |
|---|---|---|
| DE | 19630745 A1 | 2/1998 |
| DE | 102006015327 A1 | 10/2007 |
| DE | 102008011126 A1 | 9/2009 |
| DE | 102012019166 A1 | 4/2014 |
| EP | 2213912 A1 | 8/2010 |
| GB | 190429560 A | 3/1905 |
| GB | 191209969 A | 12/1912 |
| JP | 54-038430 A | 3/1979 |
| JP | 54-176057 U | 12/1979 |
| JP | 05-231459 A | 9/1993 |
| JP | 09-032922 A | 2/1997 |
| JP | 2012-163118 A | 8/2012 |
| JP | 2015-169286 A | 9/2015 |
| WO | 95/14184 A1 | 5/1995 |

* cited by examiner

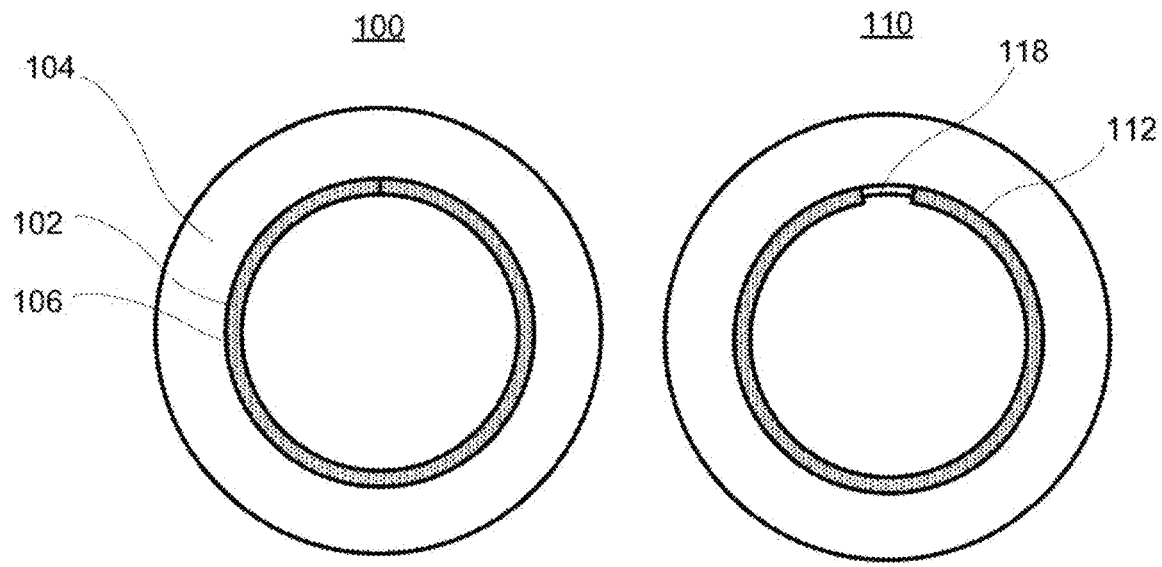
FIG. 1
(PRIOR ART)
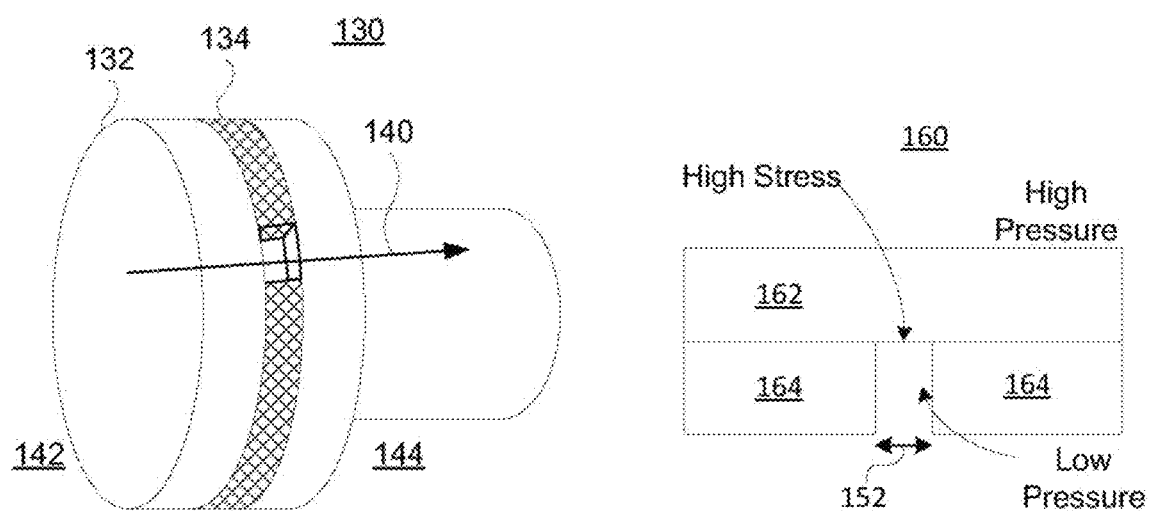
FIG. 2
(PRIOR ART)
FIG. 3
(PRIOR ART)

PISTON SEALING RING ASSEMBLY HAVING A GAP COVER ELEMENT

The present disclosure is directed towards a piston sealing ring assembly and, more particularly, the present disclosure is directed towards a piston sealing ring assembly that includes a gap cover element that maintains a seal as a sealing ring assembly wears. This application is a continuation of U.S. patent application Ser. No. 17/226,556 filed Apr. 9, 2021, which is a continuation of U.S. patent application Ser. No. 16/100,017 (now U.S. Pat. No. 10,975,966) filed Aug. 9, 2018, which claims the benefit of U.S. Provisional Patent Application Nos. 62/543,299 filed Aug. 9, 2017, and 62/543,296 filed Aug. 9, 2017, the disclosures of which are hereby incorporated by reference herein in their entirety.

BACKGROUND

In some circumstances, it is desirable for a seal to function for as long as possible before needing replacement (e.g., a long maintenance interval). For example, a typical target may be hundreds or thousands of hours of operation. Throughout these run-hours, the seal may wear down in the radial direction. To compensate for the radial wear, the seal may be split into one or more ring segments, allowing pressure to expand the ring segments outward and maintain sealing contact with the cylinder wall in spite of material removed via wear. For example, the total circumferential arc length of the resulting gaps between ring segments opens by $2*pi*\Delta R$, where $\Delta R$ is the radial wear of the seal. If, for example, a self-lubricating material is used for the seal, in which wear rates can be relatively higher than those of traditional oil-lubricated seals, the gap may open by an amount that results in an unacceptable leakage flow. This leakage limits the performance, and thus effective operating life, of the seal.

Additionally, if the ring gaps are covered from the front (i.e., high pressure region) and open to the rear of the seal (i.e., low pressure region), and are therefore at low pressure relative to the front of the seal, a large bending stress may result in the front cover ring because the front ring spans the gap in the rear ring. The bending stress in the front part may increase dramatically as the gap width gets larger (e.g., as the seal wears).

SUMMARY

In some embodiments, the present disclosure is directed to a sealing ring assembly. The sealing ring assembly includes a ring and a gap cover element. The ring includes a first end face and a second end face defining an interface. At least one of the first and second end faces at least partially faces radially inward. The ring is configured to cause the interface to widen as the ring wears. The gap cover element is configured to form a seal against the first and second end faces. The gap cover element is further configured to move radially outward to maintain the seal as the interface widens.

In some embodiments, the ring includes a radially outer surface configured to seal against a bore and the gap cover element comprises a radially outer surface configured to seal against the bore as the ring wears. As the interface widens, at least some of the radially outer surface of the gap cover element is configured to widen.

In some embodiments, the first and second end faces form a wedge-shaped recess and the gap cover element includes a wedge configured to engage with the wedge-shaped recess.

In some embodiments, the ring includes a back face configured to be in contact with a low-pressure region, and the gap cover element is configured to form the seal with the first and second end faces adjacent to the back face.

In some embodiments, the ring is a first ring, and the sealing ring assembly includes a second ring. The second ring includes at least one ring segment arranged axially adjacent to the first ring and configured to seal axially against the first ring and against the gap cover element.

In some embodiments, at least one of the ring and the one gap cover element are made at last in part of a respective self-lubricating material.

In some embodiments, the ring and the gap cover element are configured for oil-less operation.

In some embodiments, the interface is a first interface, the gap cover element is a first gap cover element, and the ring includes a third end face and a fourth end face defining a second interface. Each of the third and fourth end faces at least partially face radially inward, and the ring is configured to cause the second interface to widen as the ring wears. The sealing ring assembly includes a second gap cover element configured to form a second seal against the third and fourth end faces and the second gap cover element is configured to move radially outward to maintain the second seal as the second interface widens.

In some embodiments, the ring includes at least two ring segments.

In some embodiments, the ring includes a first axial end face and a second axial end face further defining the interface, and the gap cover element is further configured to seal against the first and second axial end faces.

In some embodiments, the at least one of the first and second end faces includes an azimuthal component and a radial component. For example, the at least one face may include a face at an angle to the radial direction.

In some embodiments, the present disclosure is directed to a piston assembly. The piston assembly includes a piston having a circumferential groove that extends around an outer surface of the piston, and a sealing ring assembly arranged in the circumferential groove.

In some embodiments, the present disclosure is directed to a device including a cylinder, a piston and a sealing ring assembly. The cylinder includes a bore, the piston includes a circumferential groove that extends around an outer surface of the piston, and the piston is configured to translate axially in the bore. The sealing ring assembly is arranged in the circumferential groove, and the sealing ring assembly is configured to seal against the bore.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 1 shows a cross-sectional end view of a portion of an illustrative piston and cylinder assembly;

FIG. 2 shows a perspective view of a portion of an illustrative piston assembly;

FIG. 3 shows a side view of a portion of an illustrative seal ring assembly;

DETAILED DESCRIPTION

Figure 4:
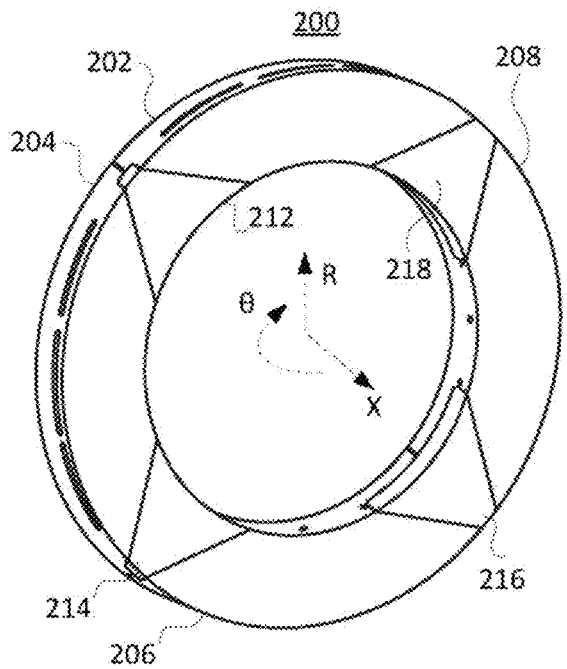
FIG. 4 shows a view of the rear face of an illustrative sealing ring assembly at a new or low wear condition, in accordance with some embodiments of the present disclosure.

The present disclosure describes a seal for sealing a gas in a piston and cylinder device, for example, in in the absence of lubricating oil. For example, the seal may include a sealing ring assembly which may be configured to travel with the piston, sealing between the piston and a bore of the cylinder. Piston and cylinder devices include, for example, engines, gas compressors, and liquid pumps.

The present disclosure provides a sealing ring assembly having geometric features for eliminating gaps between ring segments and corresponding gap cover elements on a low-pressure boundary in the sealing ring assembly, even in the case of very large amounts of radial wear. Accordingly, the sealing ring assembly maintains low leakage and mitigates increased stress at ring gaps, throughout the life of operation of the seal.

In the absence of lubricating oil, a sealing ring assembly may be constructed from a self-lubricating material such as, for example, a polymer or graphite. The use of a self-lubricating material for the seal ring assembly may aid in eliminating scuffing or galling failures but may also result in a relatively high wear rate as compared to a conventional oil-lubricated seal arrangement in which the seal is constructed of a hard, wear-resistant material (e.g., metal). In some circumstances, higher wear is inherent to the nature of the self-lubricating material, as it transfers material to the counter-face (e.g., a bore of the cylinder) to form a lubricant film.

The term "seal" as used herein, refers to the creation, maintenance, or both of a high-pressure region and a low-pressure region. For example, a seal may include a sealing ring assembly that is configured to reduce a leakage rate of gas from a high-pressure region to a low-pressure region, by limiting flow between a high-pressure boundary and a low-pressure boundary of the seal. Accordingly, a seal can be defined in terms of its constraints on a leakage rate. It will be understood that a seal, such as a sealing ring assembly, as described herein, may have any suitable corresponding leakage rate. For example, in some circumstances, a relatively worse seal may allow more leakage, but may be acceptable based on one or more relevant performance criterion. In a further example, a sealing ring assembly configured for high efficiency operation of a piston and cylinder device may have a relatively low leakage rate (e.g., be a more effective seal).

As used herein, a "ring segment" shall refer to a sealing element extending for an azimuthal angle greater than zero degrees, having a radially outer surface, and configured to seal at least along a portion of the radially outer surface against a bore. A ring segment may include end faces, if not azimuthally contiguous around the full bore.

As used herein, a "ring" shall refer to a sealing element including at least one ring segment, which may be, but need not be, azimuthally contiguous along a bore. For example, a ring may include one ring segment, in which case these terms overlap. In a further example, a ring may include four ring segments, in which case the ring refers to the collective of the four ring segments. A ring may include, but need not include, one or more interfaces between one or more ring segments. A "ring" shall also refer to a sealing element including at least one ring segment configured to seal against a land of a piston.

As used herein, a "gap cover element" shall refer to a sealing element configured to seal against one or more ring segments at an interface, and to seal against at least a portion of a bore during wear of the one or more ring segments. While a gap cover element may function as a ring segment as the ring wears, for purposes of the discussion in the present disclosure, a gap cover element is not considered to be a ring segment for purposes of clarity.

As used herein, a "sealing ring assembly" shall refer to an assembly of one or more rings, and sometimes also one or more gap covers elements, configured to engage with a piston and configured to seal between a high-pressure region and a low-pressure region of a cylinder. For example, a single ring segment may be a ring and a sealing ring assembly. In a further example, several ring segments and corresponding gap covers may be a sealing ring assembly.

As used herein, a "pressure-locking feature" shall refer to a feature included in at least one component of a sealing ring assembly that provides pressure locking functionality. As used herein, "pressure-locking" shall refer to the action of causing a resultant force on one or more components of a sealing ring assembly to maintain (or otherwise control) a relative geometric relationship between components of the sealing ring assembly, apply a force pushing components of the sealing ring assembly together, or both, during operation. The action of differential pressure across a sealing element may cause a resultant force that helps maintain the relative geometric relationship. For example, a pressure-locking feature may include a recess in one or more mating surfaces of one or more sealing elements that is open to a low-pressure region but sealed from a high-pressure region. In a further example, a pressure locking feature may include a geometric shape, arrangement, or both, that causes pressure forces to maintain a relative geometric relationship among sealing elements.

FIG. 1 shows a cross-sectional perspective view of a portion of an illustrative piston and cylinder assembly 100. Seal 102 is configured to seal between piston assembly 106 and cylinder 104, as piston assembly 106 moves axially in cylinder 104. After some amount of wear, as shown by cylinder assembly 110 of FIG. 1A, seal 112 exhibits a significant gap 118, which may serve as a leak path.

FIG. 2 shows a perspective view of a portion of illustrative piston assembly 130. Shown in FIG. 2 is leak path 140 of relatively high-pressure gas 142 past worn seal 134, arranged on piston 132, to a region of relatively lower pressure 144.

FIG. 3 shows a side view of a seal 160, and gap 152 that has opened as seal 160 wears. Ring segment 162 spans gap 152 in ring segment 164, and experiences high gas pressure (e.g., during the high-pressure portion of an engine cycle or air compression cycle) at one boundary, and low gas pressure (e.g., open to atmosphere or near atmospheric conditions). The resulting stress from the pressure forces may increase as gap 152 increases, making ring segment 162 more susceptible to breakage. Ring breakage may result in further gaps being formed, or destruction of geometrical constraints, or both, which may result in high leakage of gas from, for example, a high-pressure region to a low-pressure region.

The following description of FIGS. 4-21 includes description of illustrative sealing ring assemblies that may be, in some embodiments, configured to address at least one of the formation of gaps between ring segments and corresponding gap cover elements with increased wear, and the formation of high stress areas due to gaps forming as the sealing ring assemblies wear.

FIG. 4 shows a view of the rear face of an illustrative sealing ring assembly 200 at a new or low wear condition, in accordance with some embodiments of the present disclosure. Sealing ring assembly 200 includes ring segments 202, 204, 206, and 208 (e.g., collectively a "ring"), as well as gap cover elements 212, 214, 216, and 218. Sealing ring assembly 200 includes four ring segments and four gap cover elements, although any suitable number of ring segments and corresponding gap cover elements may be used in accordance with the present disclosure. Ring segments 202, 204, 206, 208 may also be described as a ring that has four radial splits, splitting the ring into four ring segments (e.g., ring segments 202, 204, 206, and 208) in this illustrative example.

Figure 5:
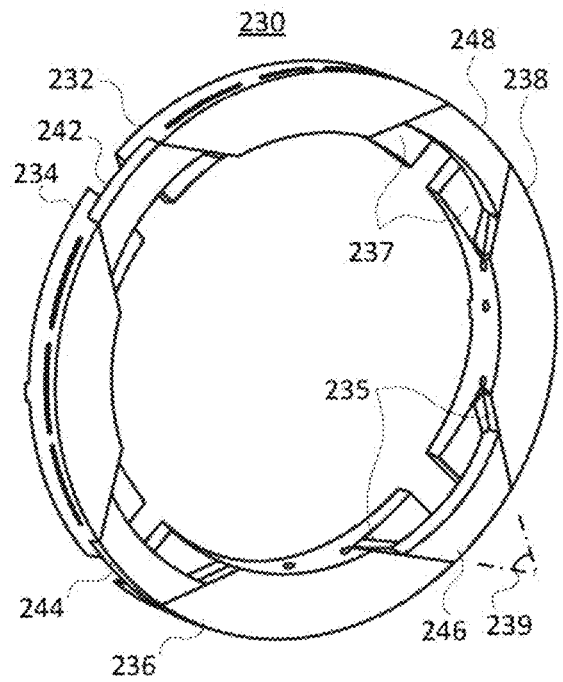
FIG. 5 shows a view of the rear face of an illustrative sealing ring assembly at a high wear condition, in accordance with some embodiments of the present disclosure.

FIG. 5 shows a view of the rear face of an illustrative sealing ring assembly 230 at a high wear condition, in accordance with some embodiments of the present disclosure. Sealing ring assembly 230 includes ring segments 232, 234, 236, and 238, as well as gap cover elements 242, 244, 246, and 248. Sealing ring assembly 230 illustratively corresponds to sealing ring assembly 200 after undergoing high wear (e.g., ring segment 236 corresponds to ring segment 206 after undergoing a high amount of wear).

Figure 6:
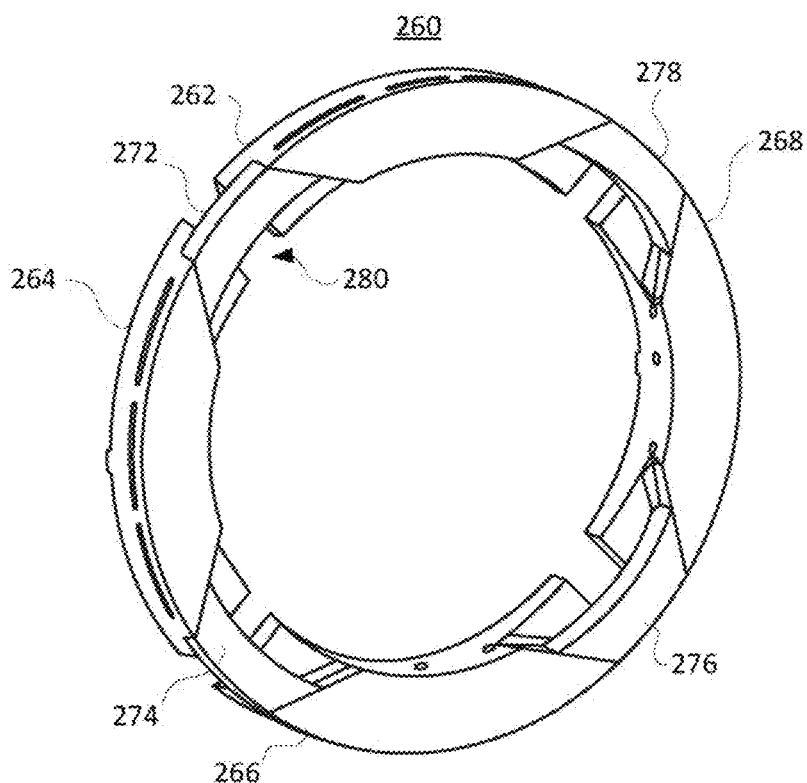
FIG. 6 shows a view of the rear face of an illustrative sealing ring assembly at an intermediate wear condition, in accordance with some embodiments of the present disclosure.

FIG. 6 shows a view of the rear face of an illustrative sealing ring assembly 260 at an intermediate wear condition, in accordance with some embodiments of the present disclosure. Sealing ring assembly 260 includes ring segments 262, 264, 266, and 268, as well as gap cover elements 272, 274, 276, and 278. Sealing ring assembly 260 illustratively corresponds to sealing ring assembly 200 after undergoing relatively less wear than sealing ring assembly 230 (e.g., ring segment 266 corresponds to ring segment 206 after undergoing an intermediate amount of wear).

The following discussion in the context of FIGS. 4-6 describes sealing ring assemblies, behavior thereof, and wear thereof. For purposes of discussion, FIGS. 4-6 may be described as views of an illustrative sealing ring assembly at different stages of wear life. Accordingly, for purposes of clarity, any of FIGS. 4-6 may be referenced to describe features of an illustrative sealing ring assembly. Geometrical directions are referred to herein in terms of cylindrical coordinates for simplicity (e.g., X is the axial direction, R is the radial direction and θ is the azimuthal direction, as shown in FIG. 4). It will also be understood that any of sealing ring assemblies 200, 230, and 260 may represent a sealing ring assembly in a new (i.e., unworn) condition. For example, a sealing ring assembly may be newly created resembling sealing ring assembly 230 (e.g., with significant gaps between ring segments on a high-pressure boundary).

The splits between ring segments 202, 204, 206, and 208 may allow movement of the ring segments radially outward to maintain sealing contact with the inner surface of the bore of a cylinder as ring material is removed via wear. Sealing ring assembly 200 may be energized radially outward against the cylinder bore by the presence of gas pressure (e.g., from a relatively high-pressure region during an engine cycle or air compression cycle) on one or more inner surfaces of sealing ring assembly 200. Sealing ring assembly 200 may be energized radially outward against the cylinder bore by a spring on one or more inner surfaces of sealing ring assembly 200.

Sealing ring assembly 200 includes four interfaces between adjacent ring segments. For example, there are respective interfaces between ring segments 202 and 204, ring segments 204 and 206, ring segments 206 and 208, and ring segments 208 and 202. An interface, as used herein, includes any space between the ends of adjacent ring segments, and contact points between adjacent ring segments, and, to the extent there are features that engage with a gap cover element, such features are considered part of the interface as well. The interfaces of sealing ring assembly 200 include respective wedge recesses located on the rear face of sealing ring assembly 200, centered at each of the interfaces. For example, interface 280 of FIG. 6 shows the interface between ring segments 262 and 264. A wedge recess is, for example, the space where gap cover element 212, which is wedge-shaped, fits, as shown illustratively in FIG. 4. As shown in FIGS. 4-6, the wedge recesses each extend through the entire radial section of the corresponding ring segments (e.g., from radially inward surface through radially outward surface). The axially-front face, also referred to as the "front face," of the wedge recesses is nominally a flat plane perpendicular to the axis of the ring (e.g., along direction X in FIG. 4). For example, wedge recess front face 237 is shown in FIG. 5. As shown in FIGS. 5 and 6, the sides of the wedge recesses are symmetric about a plane passing through the center of the radial split in the ring. The sides of the wedge (e.g., gap cover element 212) need not be symmetric, but are shown symmetric for clarity. The sides together form an included angle (e.g., included angle 239 in FIG. 5 is a wedge angle formed by gap cover element 236) that is widest at the radially inward surface of the ring and narrowest at the radially outward surface. The included angle may be a design parameter and may include any suitable angle such that the radially inward surface of the ring is wider than the radially outward surface. For example, in some embodiments, the included angle may vary between about 30 degrees and about 150 degrees. The included angle may depend on material properties (e.g., friction, fracture resistance), operating conditions (e.g., peak pressure in a high-pressure region, piston speed, engine frequency), bore conditions, fabricating preferences, installation preferences, any other suitable factors, or any combination thereof.

The term wedge, as used herein, refers to a solid having at least two faces that meet, or would meet if the wedge is truncated at the point, at an angle between (and not including) 0 and 180 degrees. A wedge includes a wide end and a narrow end. The faces that angle towards one another from the wide end to the narrow end are termed wedge surfaces. For example, gap cover element 212 is wedge shaped, and may be termed a wedge herein. The narrow end of gap cover element 212 is radially outward, and the wide end is radially inward. For example, wedge recess surfaces 235 of ring segments 236 and 238 engage with corresponding wedge surfaces of gap cover element 246 to create a seal (e.g., configured to restrict gas leakage). A gap cover element may also include a wedge feature (e.g., gap cover element 612 of FIG. 14), along with non-wedge geometry (e.g., the curved portion of gap cover element 612 that resembles a ring segment). It will be understood that the present disclosure is described herein primarily in the context of a wedge-shaped gap cover element for purposes of brevity and clarity and not by way of limitation. Any suitably shaped gap cover element, or combination of differently shaped gap cover elements, may be used according to the general teachings of the present disclosure. For example, a sealing ring assembly may include ring segments that are the same or different and may include gap cover elements that are the same or different.

Gap cover elements 212, 214, 216, and 218 are wedge shaped, and fit into corresponding wedge recesses in interfaces between adjacent ring segments (e.g., ring segments 202 and 204). Gap cover elements fitted into each of the corresponding recesses, may form a closed seal with no significant gaps (e.g., thus restricting gas leakage). As the components of sealing ring assembly 200 wear, they may wear-in with adjacent components to form, and maintain, a more complete seal. Gap cover elements 212, 214, 216, and 218 are acted upon by gas pressure on the radially inner surface, exerting a force radially outward, in the same manner as the corresponding ring segments. For example, during high pressure portions of an engine cycle or air compressor cycle, high gas pressure may act on the radially inner surfaces of gap cover elements 212, 214, 216, and 218. This high gas pressure forces the angled sides of each gap cover element against the corresponding angled sides of the corresponding wedge recess, creating a seal against radial gas leakage through the split in the ring. Also, when acted on by high gas pressure at the radially inward surface, the radially outward surface of the wedge-shaped gap cover element presses against the inner surface of the cylinder (e.g., the bore), forming a seal against axial leakage through the split, past the sealing ring assembly.

In some embodiments, sealing ring assembly 200 may be include a solid-lubricant material such as, for example, graphite. For example, a ring may be machined from graphite, and split into ring segments 202, 204, 206, 208. In a further example, ring segments 202, 204, 206, and 208 may be machined as separate parts. In another further example, gap cover elements 212, 214, 216, and 218 may be machined from graphite as separate parts. In another example, ring assembly 200 may be machined from graphite as a single ring, and then further machined (e.g., wire or laser cut) into ring segments 202, 204, 206, and 208 and into gap cover elements 212, 214, 216, and 218.

As ring segments 202, 204, 206, and 208 wear they move outward and the splits open wider (e.g., shown illustratively by corresponding ring segments 232, 234, 236, and 238). Gap cover elements 212, 214, 216, and 218 are pressed outward by gas pressure, and wear in the radial direction while being supported by the angled sides of the respective wedge recess. Accordingly, the wear rate of the gap cover element may be self-adjusting to maintain contact with both the angled sides of the wedge recess and the cylinder inner surface (e.g., the bore). In some circumstances, gap cover elements may wear at a faster rate than corresponding ring segments, and the wear rate may depend on the wedge angle. Because the gap cover elements maintain contact with the angled sides of the respective wedge recesses, as well as the bore, sealing performance may be maintained throughout the life of operation (e.g., as the sealing ring assembly wears). Further, there are no significant gaps between the ring segments and corresponding gap cover elements exposed to a low-pressure boundary of the sealing ring assembly. Each ring segment is supported everywhere either by pressure or by the wedge, avoiding the stress scenario described in the context of FIG. 3. As the sealing ring assembly wears, the at least one gap cover element correspondingly wears to prevent a substantial ring gap between the ring segments and the corresponding gap cover element from forming on the low-pressure boundary of the sealing ring assembly. A ring gap between a wedge and wedge recess may also be prevented on a low-pressure boundary of a sealing assembly.

Figure 7:
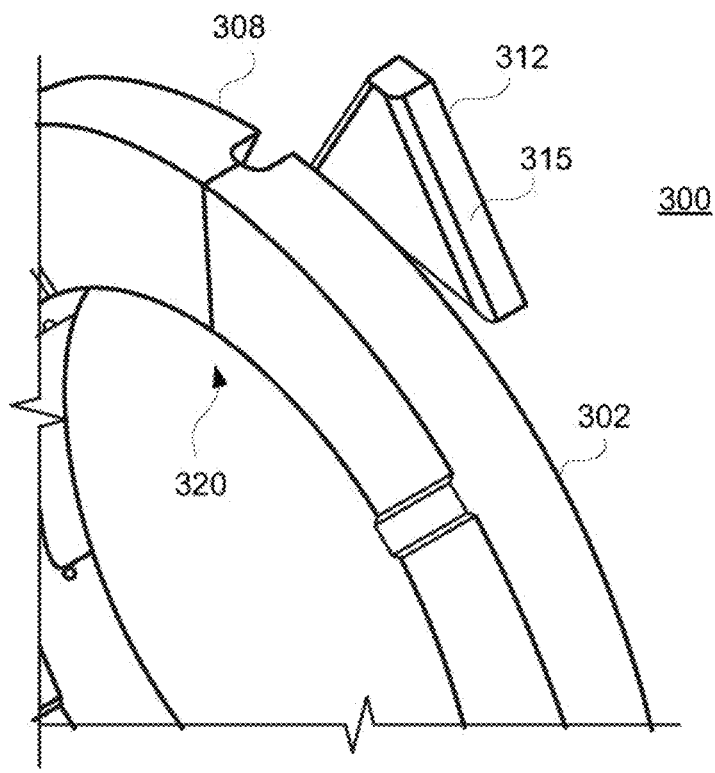
FIG. 7 shows a view of the front face of an illustrative sealing ring assembly at a new or low wear condition, with a gap cover element removed, in accordance with some embodiments of the present disclosure.
Figure 8:
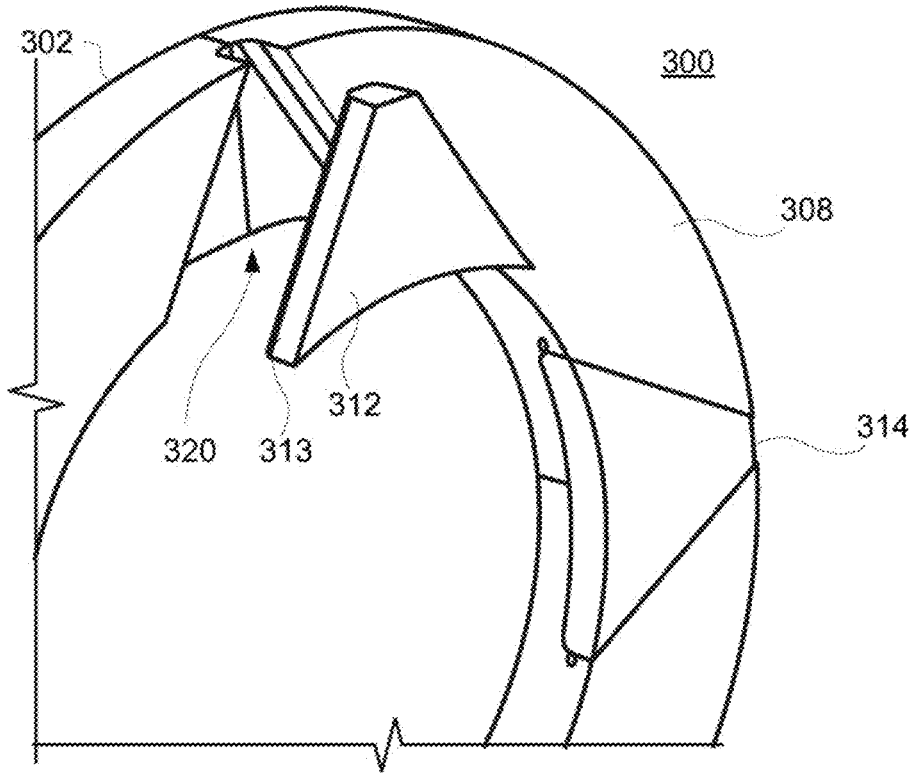
FIG. 8 shows a view of the rear face of an illustrative sealing ring assembly at a new or low wear condition, with a gap cover element removed, in accordance with some embodiments of the present disclosure.

FIG. 7 shows a view of the front face of illustrative sealing ring assembly 300 at a new or low wear condition, with gap cover element 312 removed, in accordance with some embodiments of the present disclosure. Illustrative sealing ring assembly 300, as shown, is similar to sealing ring assembly 200, for example. FIG. 8 shows a view of the rear face of illustrative sealing ring assembly 300 at a new or low wear condition, with gap cover element 312 removed, in accordance with some embodiments of the present disclosure. Gap cover element 314 is shown in place, for reference. Interface 320 refers to the spatial region where ring segments 302 and 308 meet. Interface 320 includes a wedge recess, as well as the split between ring segments 302 and 308, where they touch or very nearly touch (e.g., at the front face of the sealing ring assembly). Gap cover element 312 includes wedge surfaces 313 and 315, for example, which may engage corresponding wedge recess surfaces when gap cover element 312 is arranged in place in the interface of ring segments 302 and 304.

Figure 9:
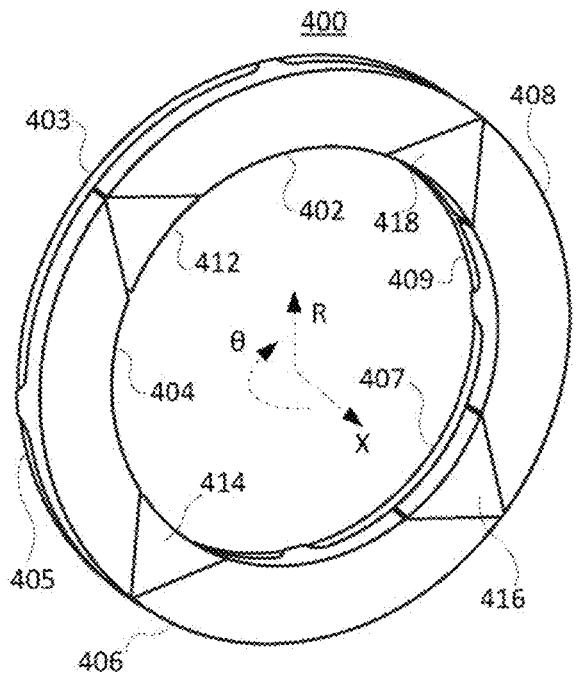
FIG. 9 shows a view of the rear face of an illustrative sealing ring assembly at a new or low wear condition, in accordance with some embodiments of the present disclosure.

FIG. 9 shows a view of the rear face of an illustrative sealing ring assembly 400 at a new or low wear condition, in accordance with some embodiments of the present disclosure. Sealing ring assembly 400 includes first ring segments 402, 404, 406, and 408, second ring segments 403, 405, 407, and 409, as well as gap cover elements 412, 414, 416, and 418. Sealing ring assembly 400 includes four first ring segments, four second ring segments, and four gap cover elements, although any suitable number of first ring segments, second ring segments, and corresponding gap cover elements may be used in accordance with the present disclosure. First ring segments 402, 404, 406, and 408 may also be described as a first ring that has four radial splits, splitting the first ring into four first ring segments (e.g., first ring segments 402, 404, 406, and 408) in this illustrative example.

Figure 10:
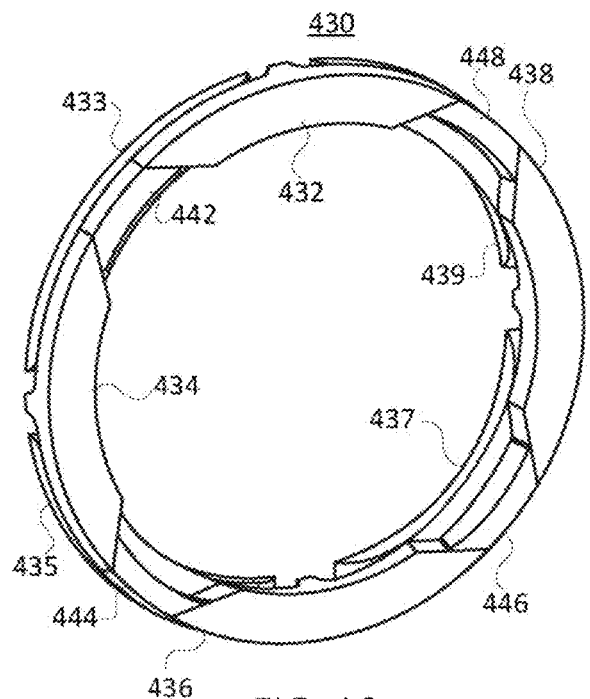
FIG. 10 shows a view of the rear face of an illustrative sealing ring assembly at a high wear condition, in accordance with some embodiments of the present disclosure.

FIG. 10 shows a view of the rear face of an illustrative sealing ring assembly 430 at a high wear condition, in accordance with some embodiments of the present disclosure. Sealing ring assembly 430 includes first ring segments 432, 434, 436, and 438, second ring segments 433, 435, 437, and 439, as well as gap cover elements 442, 444, 446, and 448. Sealing ring assembly 430 illustratively corresponds to sealing ring assembly 400 after undergoing high wear (e.g., first ring segment 436 corresponds to first ring segment 406 after undergoing high wear).

Figure 11:
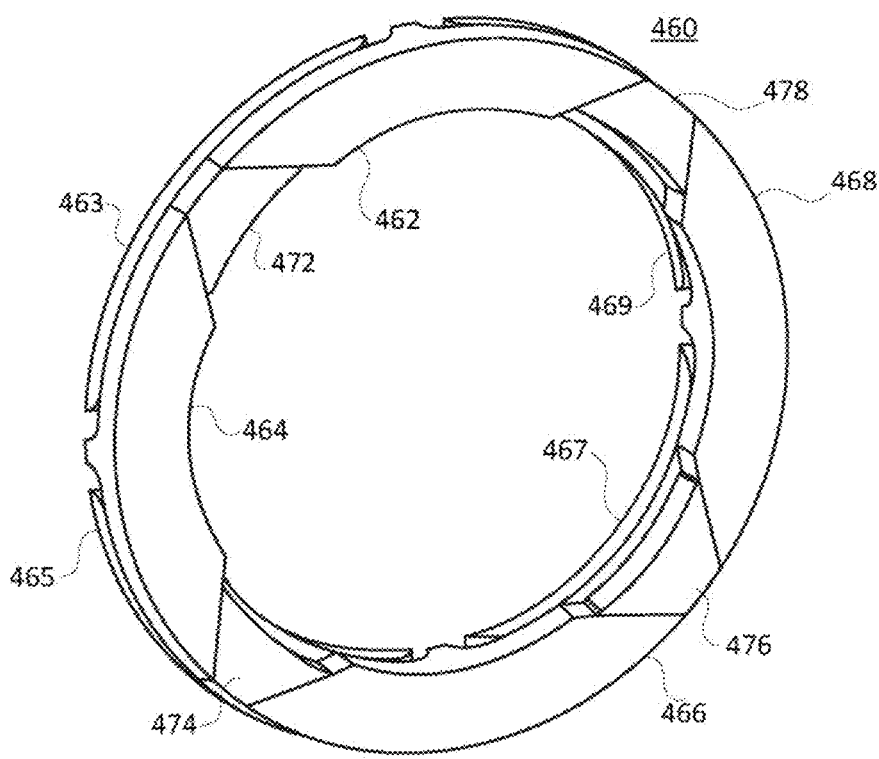
FIG. 11 shows a view of the rear face of an illustrative sealing ring assembly at an intermediate wear condition, in accordance with some embodiments of the present disclosure.

FIG. 11 shows a view of the rear face of an illustrative sealing ring assembly 460 at an intermediate wear condition, in accordance with some embodiments of the present disclosure. Sealing ring assembly 460 includes first ring segments 462, 464, 466, and 468, second ring segments 463, 465, 467, and 469, as well as gap cover elements 472, 474, 476, and 478. Sealing ring assembly 460 illustratively corresponds to sealing ring assembly 400 after undergoing less wear than sealing ring assembly 430 (e.g., first ring segment 466 corresponds to first ring segment 406 after undergoing intermediate wear).

The following discussion is described in the context of FIGS. 9-11 to describe the sealing ring assembly, behavior thereof, and wear thereof. For purposes of discussion, FIGS. 9-11 may be described as views of an illustrative sealing ring assembly at different stages of wear life. Accordingly, for purposes of clarity any of FIGS. 9-11 may be referenced to describe features of an illustrative sealing ring assembly. Geometrical directions are referred to herein in terms of cylindrical coordinates for simplicity (e.g., X is the axial direction, R is the radial direction and θ is the azimuthal direction, as shown in FIG. 9). It will also be understood that any of sealing ring assemblies 400, 430, and 460 may represent a sealing ring assembly in a new condition. For example, a sealing ring assembly may be newly created resembling sealing ring assembly 430 (e.g., with significant gaps between second ring segments on a high-pressure boundary).

The splits between first ring segments 402, 404, 406, and 408 may allow movement of the first ring segments radially outward to maintain sealing contact with the inner surface of the bore of a cylinder as ring material is removed via wear. Sealing ring assembly 400 may be energized radially outward against the cylinder bore by the presence of gas pressure (e.g., from a relatively high-pressure portion of an engine cycle or air compression cycle) on the inner surface of the sealing ring assembly.

Sealing ring assembly 400 includes four interfaces between adjacent first ring segments. For example, there are respective interfaces between ring segments 402 and 404, ring segments 404 and 406, ring segments 406 and 408, and ring segments 408 and 402. The interfaces of sealing ring assembly 400 include respective wedge recesses, centered at each of the interfaces. A wedge recess is, for example, the space where wedge-shaped gap cover element 412 fits, as shown in FIG. 9. As shown in FIGS. 9-11, the wedge recesses each extend through the entire radial section (e.g., from radially inward surface through radially outward surface), and the entire axial section of the corresponding first ring segments (e.g., from the respective front faces to the respective back faces of the second ring segments). As shown in FIGS. 10 and 11, the sides of the wedge recesses are symmetric about a plane passing through the center of the radial split in the first ring, however the sides need not be symmetric.

Gap cover elements 412, 414, 416, and 418 are wedge shaped, and fit into corresponding wedge recesses formed in interfaces between adjacent first ring segments (e.g., ring segments 402 and 404). Wedge shaped gap cover elements 412, 414, 416, and 418 may be acted upon by gas pressure on the radially inner surface, exerting a force radially outward. For example, during high pressure portions of an engine cycle or air compressor cycle, high gas pressure may act on the radially inner surfaces of gap cover elements 412, 414, 416, and 418. This high gas pressure forces the angled sides of each gap cover element against the correspondingly angled sides of the wedge recess, creating a seal against radial gas leakage through the split. Also, when acted on by high gas pressure at the radially inward surface, the radially outward surface of the gap cover element presses against the inner surface of the cylinder (e.g., the bore), forming a seal against axial leakage through the split, past the sealing ring assembly.

Second ring segments 403, 405, 407, and 409 are arranged axially forward of first ring segments 402, 404, 406, and 408, centered at the respective interfaces of the first ring segments. As sealing ring assembly 400 wears, second ring segments 403, 405, 407, and 409 assist sealing near the interfaces, so that if any gaps start to form at the interfaces near the gap cover elements (e.g., from first ring segments moving out of round, or other configurational changes), the gaps remain sealed by the first ring segments.

In some embodiments, sealing ring assembly 400 is a pressure locked assembly based at least in part on the high-pressure boundary, and based at least in part on the low-pressure boundary. Pressure locking refers to the behavior of the sealing ring assembly in response to the high-pressure boundary and the low-pressure boundary. When pressure locked, the net effect of the pressure forces from the high-pressure boundary and the low-pressure boundary may be used to maintain the configuration, and accordingly maintain the seal, of the ring segments and at least one gap covers. For example, during operation, if gap cover element 412 were perturbed to move radially inward (e.g., and lose, or start to lose, engagement), the net pressure forces would act to restore gap cover element 412 to sealing against the wedge recess.

In a further example of pressure locking, considering each of gap cover elements 472, 474, 476, and 478 during operation, the radially inward surface of each is larger than the corresponding radially outward surface. Also, the pressure at each radially inward surface is indicative of a high-pressure region, while the pressure at each radially outward surface is equal to or less than this pressure. Accordingly, the resultant radial force from pressure forces on each of gap cover elements 472, 474, 476, and 478 may be directed radially outward, thus aiding in maintaining the relative positions of gap cover elements 472, 474, 476, and 478, first ring segments 462, 464, 466, and 468, and second ring segments 463, 465, 467, and 469.

In a further example of pressure locking, considering each of second ring segments 463, 465, 467, and 469 during operation, the axially forward surface of each exposed to high-pressure gas is larger than the corresponding axially rearward surface exposed to high pressure gas (e.g., that is not covered/sealed by a gap cover element or first ring segment). Also, the pressure at each axially forward surface is indicative of a high-pressure region, while the pressure at each axially rearward surface is equal to or less than this pressure. Accordingly, the resultant axial force from pressure forces on each of second ring segments 463, 465, 467, and 469 may be directed axially rearward, thus aiding in maintaining the relative positions of gap cover elements 472, 474, 476, and 478, first ring segments 462, 464, 466, and 468, and second ring segments 463, 465, 467, and 469.

In some embodiments, sealing ring assembly 400 may be include a solid-lubricant material such as, for example, graphite. For example, a first ring may be machined from graphite, and split into first ring segments 402, 404, 406, and 408. In a further example, first ring segments 402, 404, 406, and 408 may be machined as separate parts. In another further example, first ring segments 402, 404, 406, and 408 may be machined from graphite as separate parts. In another example, sealing ring assembly 400 may be machined from graphite as a single ring, and then further machined (e.g., wire or laser cut) into first ring segments 402, 404, 406, 408, second ring segments 403, 405, 407, and 409, and into gap cover elements 412, 414, 416, and 418.

As first ring segments 402, 404, 406, and 408 wear, they move outward and the splits at the interfaces open wider (e.g., shown illustratively by corresponding first ring segments 432, 434, 436, and 438). Gap cover elements 472, 474, 476, and 478 are pressed outward by gas pressure and wear in the radial direction while being supported by the angled sides of the respective wedge recesses. Accordingly, the wear rates of gap cover elements 472, 474, 476, and 478 may be self-adjusting to maintain contact with both the angled sides of the wedge recess and the cylinder inner surface (e.g., the bore). In some circumstances, gap cover elements may wear at a faster rate than the corresponding ring segments, and the wear rate may depend on the wedge angle. Because gap cover elements 472, 474, 476, and 478 maintain contact with the angled sides of the respective wedge recesses, as well as the bore, sealing performance may be maintained throughout the life of operation (e.g., as the ring wears). Further, there are no significant gaps between the ring segments and corresponding gap cover elements exposed to a low-pressure boundary of the sealing ring assembly. The ring segment is supported everywhere either by pressure or by the wedge, avoiding the stress scenario described in the context of FIG. 3.

Figure 12:
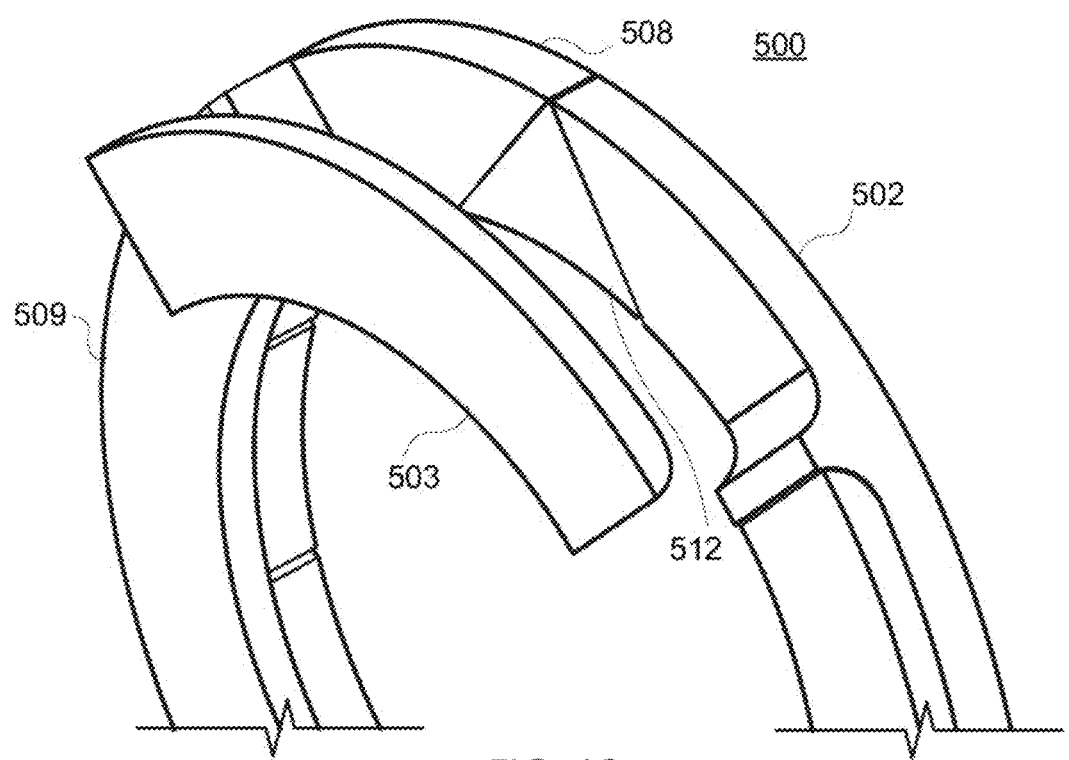
FIG. 12 shows a view of the front face of an illustrative sealing ring assembly at a new or low wear condition, with a second ring segment removed, in accordance with some embodiments of the present disclosure.
Figure 13:
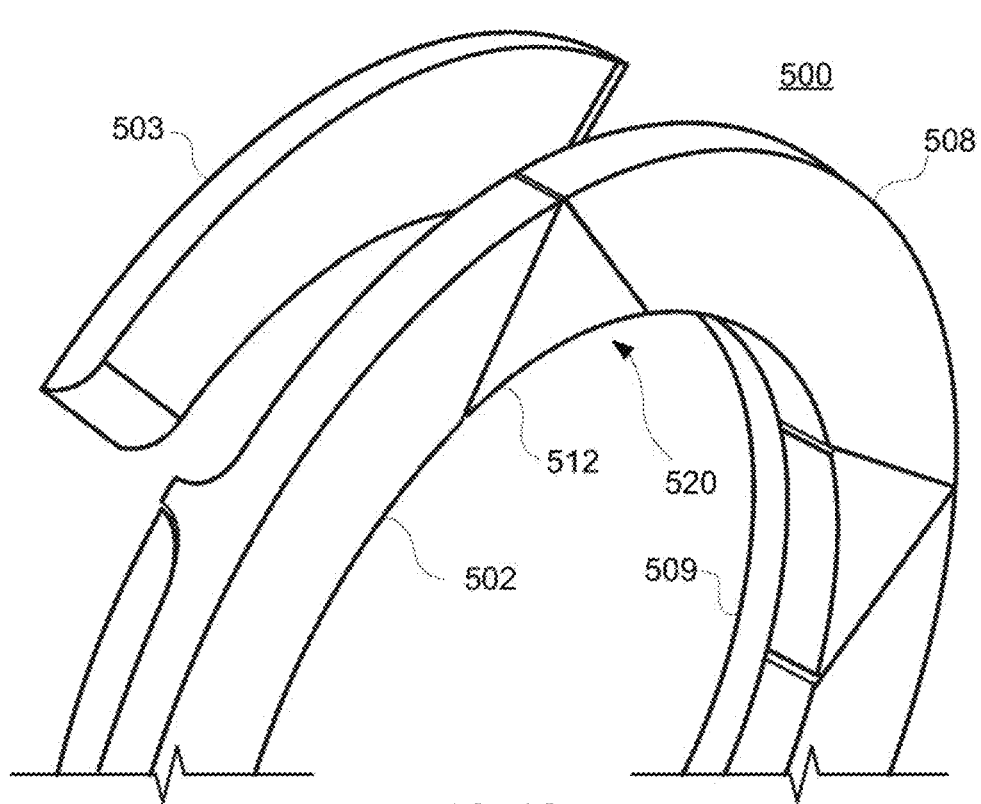
FIG. 13 shows a view of the rear face of an illustrative sealing ring assembly at a new or low wear condition, with a second ring segment removed, in accordance with some embodiments of the present disclosure.

FIG. 12 shows a view of the front face of illustrative sealing ring assembly 500 at a new or low wear condition, with second ring segment 503 removed, in accordance with some embodiments of the present disclosure. Illustrative sealing ring assembly 500, as shown, is similar to sealing ring assembly 400, for example. FIG. 13 shows a view of the rear face of illustrative sealing ring assembly 500 at a new or low wear condition, with second ring segment 503 removed, in accordance with some embodiments of the present disclosure. Second ring segment 509 is shown in place, for reference. Gap cover element 512 engages the wedge recess in interface 520 where first ring segments 502 and 508 meet. Interface 520 includes an axially-through wedge recess.

Figures 14, 15:
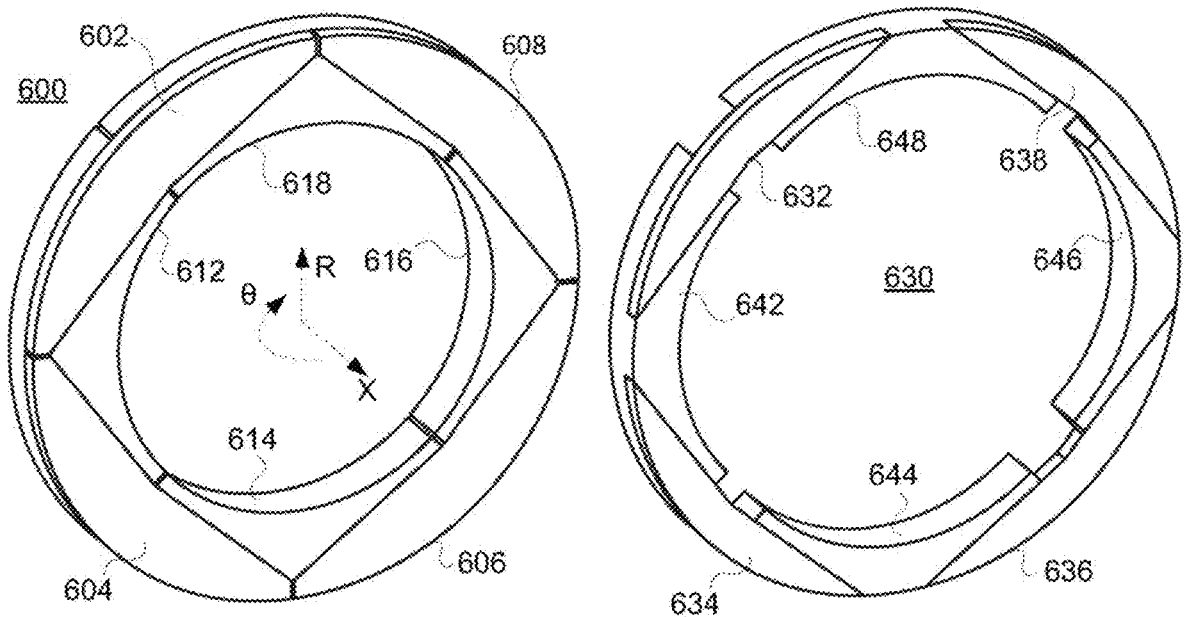
FIG. 14 shows a view of the rear face of an illustrative sealing ring assembly at a new or low wear condition, in accordance with some embodiments of the present disclosure.
FIG. 15 shows a view of the rear face of an illustrative sealing ring assembly at a high wear condition, in accordance with some embodiments of the present disclosure.

FIG. 14 shows a view of the rear face of an illustrative sealing ring assembly 600 at a new or low wear condition, in accordance with some embodiments of the present disclosure. Sealing ring assembly 600 includes ring segments 602, 604, 606, and 608, as well as gap cover elements 612, 614, 616, and 618. Sealing ring assembly 600 includes four ring segments and four gap cover element, although any suitable number of ring segments and corresponding gap cover elements may be used in accordance with the present disclosure.

FIG. 15 shows a view of the rear face of an illustrative sealing ring assembly 630 at a high wear condition, in accordance with some embodiments of the present disclosure. Sealing ring assembly 630 includes ring segments 632, 634, 636, and 638, as well as gap cover elements 642, 644, 646, and 648. Sealing ring assembly 630 illustratively corresponds to sealing ring assembly 600 after undergoing high wear (e.g., ring segment 636 corresponds to ring segment 606 after undergoing high wear).

Figure 16:
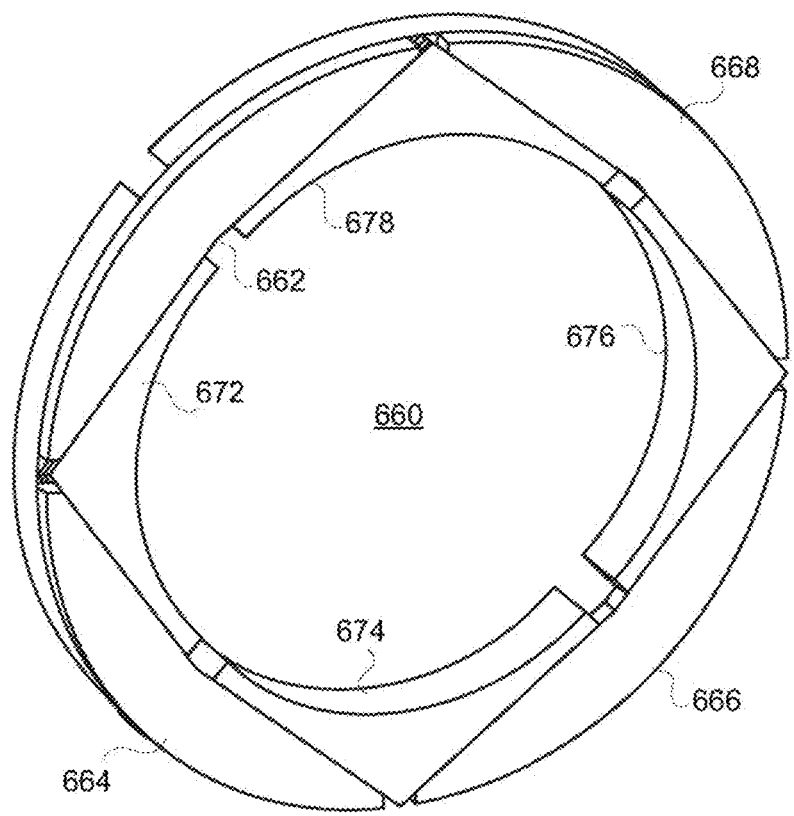
FIG. 16 shows a view of the rear face of an illustrative sealing ring assembly at an intermediate wear condition, in accordance with some embodiments of the present disclosure.

FIG. 16 shows a view of the rear face of an illustrative sealing ring assembly 660 at an intermediate wear condition, in accordance with some embodiments of the present disclosure. Sealing ring assembly 660 includes ring segments 662, 664, 666, and 668, as well as gap cover elements 672, 674, 676, and 678. Sealing ring assembly 660 illustratively corresponds to sealing ring assembly 600 after undergoing less wear than sealing ring assembly 630 wear (e.g., ring segment 666 corresponds to ring segment 606 after undergoing intermediate wear).

The following discussion is described in the context of FIGS. 14-16 to describe the sealing ring assembly, behavior thereof, and wear thereof. For purposes of discussion, FIGS. 14-16 may be described as views of an illustrative sealing ring assembly at different stages of wear life. Accordingly, for purposes of clarity any of FIGS. 14-16 may be referenced to describe features of an illustrative sealing ring assembly. Geometrical directions are referred to herein in terms of cylindrical coordinates for simplicity (e.g., X is the axial direction, R is the radial direction and θ is the azimuthal direction, as shown in FIG. 14). It will also be understood that any of sealing ring assemblies 600, 630, and 660 may represent a sealing ring assembly in a new condition. For example, a sealing ring assembly may be newly created that resembles sealing ring assembly 630 (e.g., with significant gaps between gap cover elements on a high-pressure boundary).

Ring segments 602, 604, 606, and 608 may move radially outward to maintain sealing contact with the inner surface of the bore of a cylinder as ring material is removed via wear. Sealing ring assembly 600 may be energized radially outward against the cylinder bore by the presence of gas pressure (e.g., from a relatively high-pressure portion of an engine cycle or air compression cycle) on the inner surface of sealing ring assembly 600.

Sealing ring assembly 600 includes four interfaces between adjacent ring segments. For example, there are respective interfaces between ring segments 602 and 604, ring segments 604 and 606, ring segments 606 and 608, and ring segments 608 and 602. The interfaces of sealing ring assembly 600 form respective wedge recesses, centered at each of the interfaces. A wedge recess is, for example, the space where wedge-shaped gap cover element 612 fits, as shown in FIG. 14. As shown in FIGS. 14-16, the wedge recesses each extend through the entire radial section of the corresponding ring segments (e.g., from radially inward surface through radially outward surface), and the entire axial section of the ring segments. As shown in FIGS. 15 and 16, the sides of the wedge recesses are symmetric about a plane passing through the center of the radial split in the ring. The sides together form a wedge angle that is widest at the radially inner surface of the ring segments and narrowest at the radially outer surface.

Gap cover elements 612, 614, 616, and 618 include respective wedges, and fit into corresponding wedge recesses formed in interfaces between adjacent ring segments (e.g., ring segments 602 and 604). Gap cover elements fitted into each of the corresponding recesses, may form a seal with no gaps. The gap cover elements are acted upon by gas pressure on the radially inner surface, exerting a force radially outward. For example, during high pressure portions of an engine cycle or air compressor cycle, high gas pressure may act on the radially inner surfaces of gap cover elements 612, 614, 616, and 618. This high gas pressure forces the angled sides of each gap cover element against the corresponding angled sides of the respective wedge recess, creating a seal against radial gas leakage through the interface. Also, when acted on by high gas pressure at the radially inward surface, the radially outward surface of the gap cover element presses against the inner surface of the cylinder (e.g., the bore), forming a seal against axial leakage through the interface, past the sealing ring assembly.

In some embodiments, sealing ring assembly 600 may be include a solid-lubricant material such as, for example, graphite.

As ring segments 602, 604, 606, and 608 wear they move outward and the splits open wider (e.g., shown illustratively by corresponding ring segments 632, 634, 636, and 638). Gap cover elements 662, 664, 666, and 668 are pressed outward by gas pressure and wear in the radial direction while being supported by the angled sides of the respective wedge recesses. Accordingly, the wedge wear rate may be self-adjusting to maintain contact with both the angled sides of the wedge recess and the cylinder inner surface (e.g., the bore). In some circumstances, gap cover elements may wear at a faster rate than the corresponding ring segments, and wear rate may depend on the wedge angle. In some circumstances, ring segments may wear at the same rate as, or a faster rate than, the corresponding gap cover elements. Because the gap cover elements maintain contact with the angled sides of the respective wedge recesses, as well as the bore, sealing performance may be maintained throughout the life of operation (e.g., as sealing ring 600 wears). Further, there are no significant gaps between the ring segments and gap cover elements exposed to a low-pressure boundary of sealing ring assembly 600. Each ring segment is supported everywhere either by pressure or by the piston, avoiding the stress scenario described in the context of FIG. 3.

Figure 17:
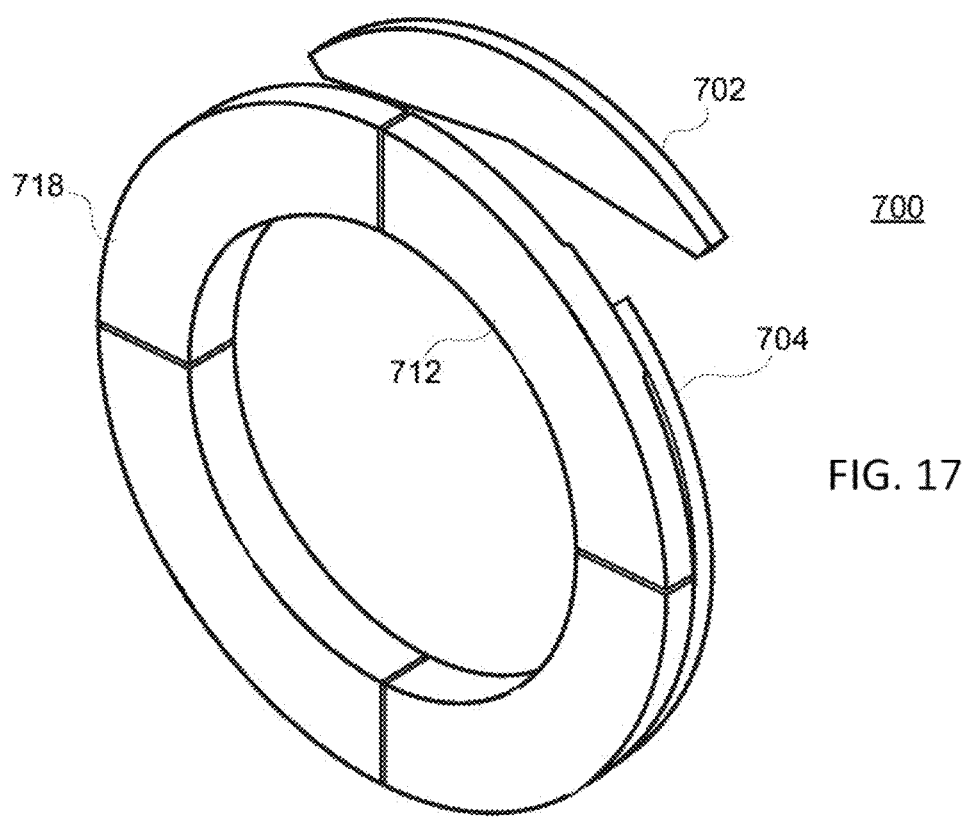
FIG. 17 shows a view of the front face of an illustrative sealing ring assembly at a new or low wear condition, with a ring segment removed, in accordance with some embodiments of the present disclosure.
Figure 18:
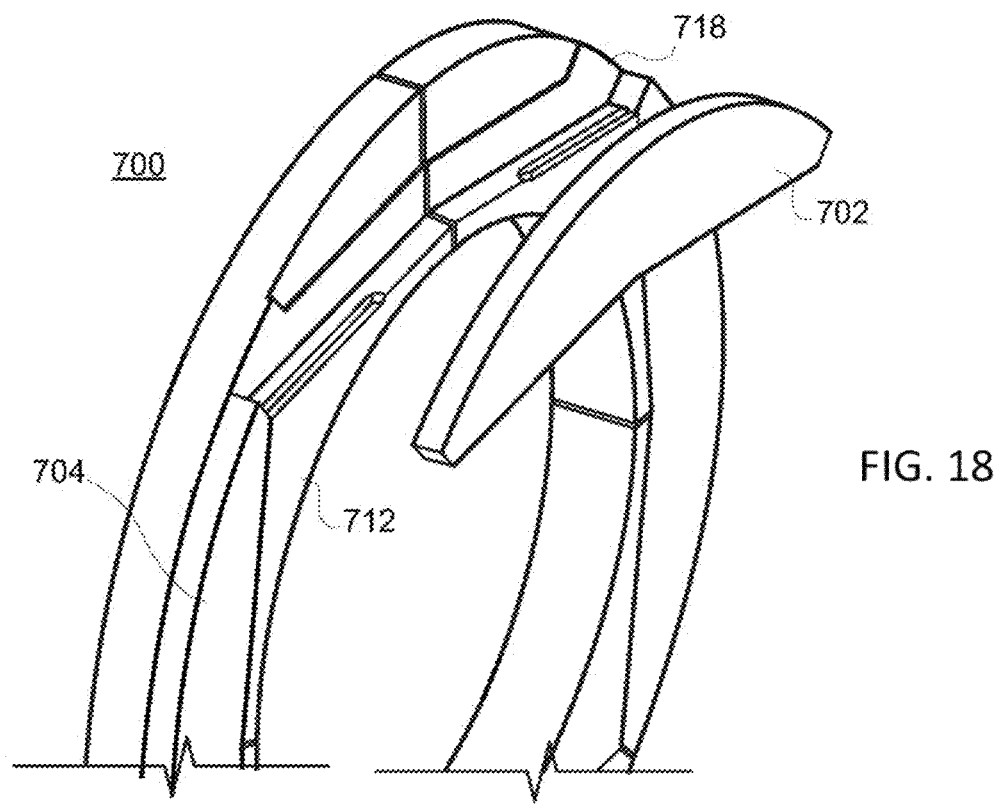
FIG. 18 shows a view of the rear face of an illustrative sealing ring assembly at a new or low wear condition, with a ring segment removed, in accordance with some embodiments of the present disclosure.

FIG. 17 shows a view of the front face of illustrative sealing ring assembly 700 at a new or low wear condition, with ring segment 702 removed, in accordance with some embodiments of the present disclosure. Illustrative sealing ring assembly 700, as shown, is similar to ring assembly 600, for example. FIG. 18 shows a view of the rear face of illustrative sealing ring assembly 700 at a new or low wear condition, with ring segment 702 removed, in accordance with some embodiments of the present disclosure. Ring segment 704 is shown in place, for reference. It will be understood that sealing ring assembly 700, as shown, includes gap cover elements 712 and 718 that are larger (e.g., more volume, and more mass if of the same material) than ring segments 702 and 704. It will be understood that gap cover elements and ring segments may be of any suitable relative sizes (e.g., thicknesses, widths, areas, volumes), masses, or both.

Figure 19:
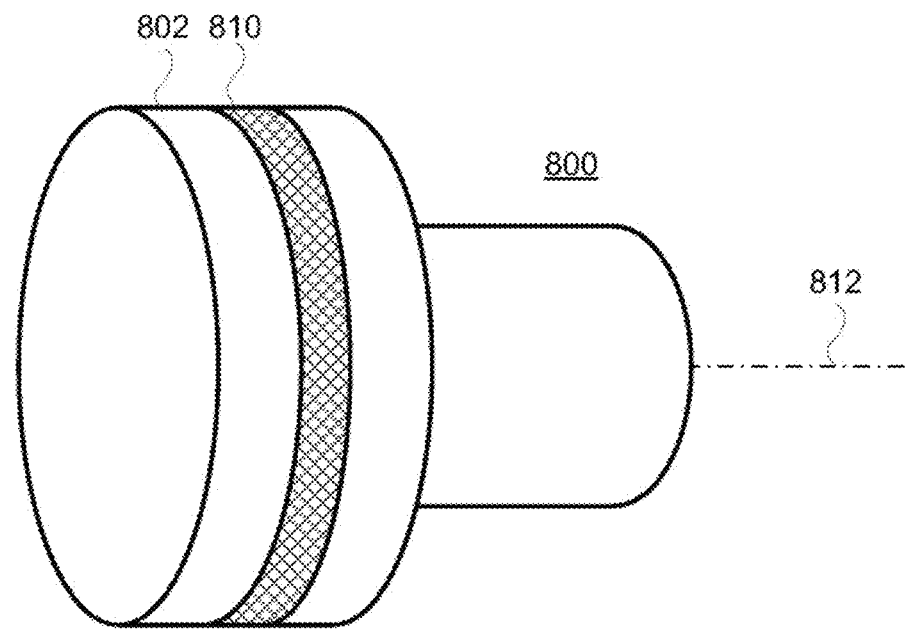
FIG. 19 shows an illustrative piston assembly including a sealing ring assembly in accordance with some embodiments of the present disclosure.

FIG. 19 shows illustrative piston assembly 800 including sealing ring assembly 810, in accordance with some embodiments of the present disclosure. Piston assembly 800 includes piston 802, onto which sealing ring assembly 810 is arranged. For example, piston 802 may include a ring groove into which sealing ring assembly 810 fits. Piston assembly 800 may be configured to translate along axis 812. In some embodiments, piston 802 may be an open-faced piston. In some embodiments, piston 802 may include more than one ring groove to accommodate more than one respective sealing ring assembly. In some embodiments, piston 802 may include an integrated gap cover feature. For example, a ring may include one or more ring segments having one or more corresponding interfaces. A piston may include an integrated gap cover feature arranged at any of the one or more interfaces. In an illustrate example, a ring may include four ring segments having four interfaces, for which wedge-shaped gap cover elements are included at two interfaces, and piston-integrated gap cover features are included at the other two interfaces.

Figure 20:
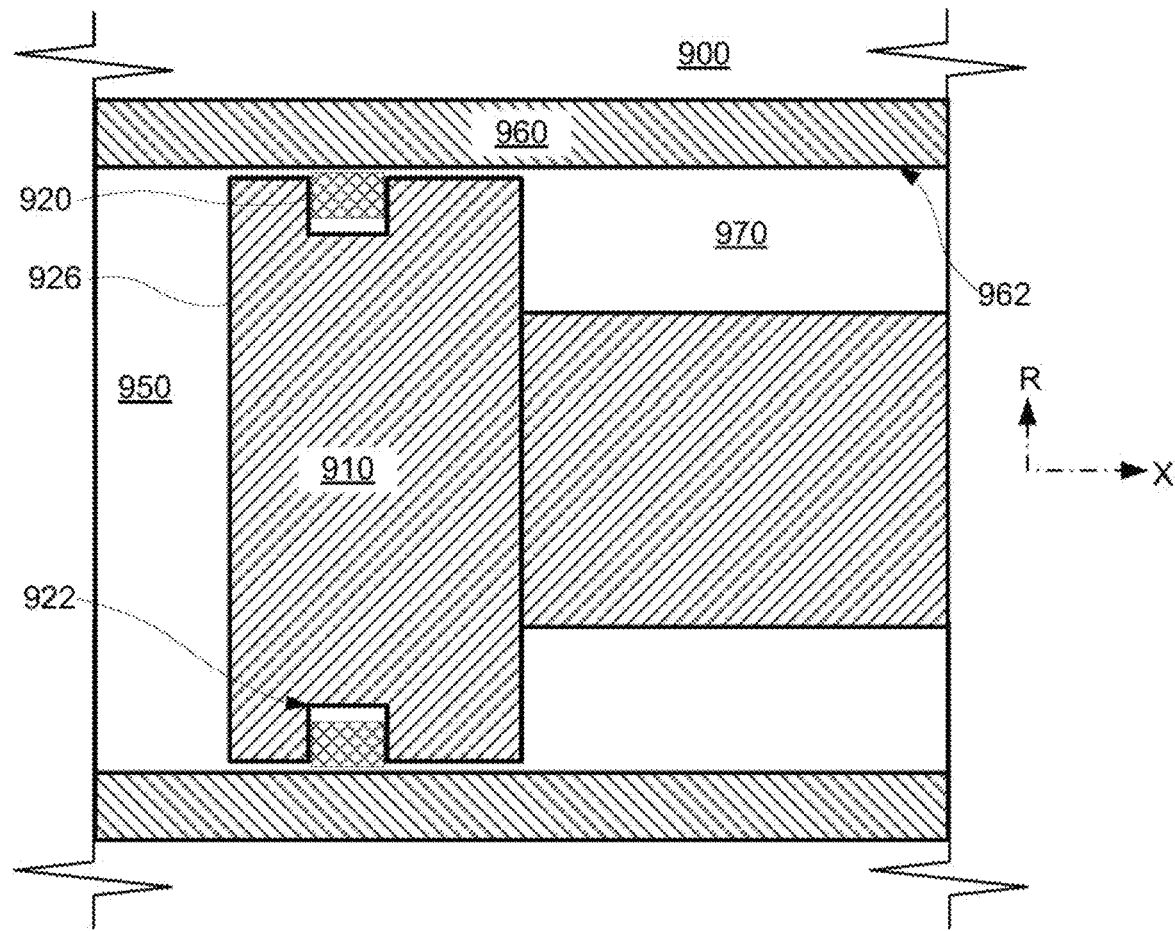
FIG. 20 shows a cross section view of an illustrative piston and cylinder assembly including a sealing ring assembly in accordance with some embodiments of the present disclosure.

FIG. 20 shows a cross section view of illustrative piston and cylinder assembly 900 including sealing ring assembly 920, in accordance with some embodiments of the present disclosure. Cylinder 960 may include bore 962, which is the inner cylindrical surface in which piston assembly 910 travels. Piston assembly 910 may include piston 926, which includes a sealing ring groove 922, in which sealing ring assembly 920 is configured to ride. As piston assembly 910 translates along the X direction (e.g., during an engine cycle), in cylinder 960, the gas pressure in high pressure region 950 may change (high pressure region 950 may be closed with a cylinder head or an opposing piston). For example, as piston assembly 910 moves in the negative X direction (i.e., to the left in FIG. 20), the pressure in high pressure region may increase. Low pressure region 970, located to the rear of the sealing ring assembly may be at a gas pressure below the pressure of high pressure region 950 for at least some, if not most, of a stroke or cycle of piston and cylinder assembly 900. The pressure ranges in high-pressure region 950 and low-pressure region 970 may be any suitable ranges (e.g., sub-atmospheric pressure to well over 250 bar), and may depend on compression ratio, engine breathing details (e.g., boost pressure, pressure waves, port timing), losses, thermochemical properties of gases, and reaction thereof. Accordingly, the sealing ring assemblies described herein may be used to seal any suitable high-pressure region and low-pressure region, having any suitable pressure ranges. For example, in some embodiments, low pressure region 970 may interact flow-wise with intake or exhaust ducting, and be maintained relatively near pressure in the ducting. In an illustrative example, low pressure region 970 may open to intake breathing ports, and may be at a pressure near to or strongly affected by (e.g., on average) an intake pressure (e.g., a boost pressure). In a further illustrative example, low pressure region 970 may open to exhaust breathing ports, and may be at a pressure near to or strongly affected by (e.g., on average) an exhaust pressure. In accordance with the present disclosure, sealing ring assemblies may be used to seal high pressure regions from low pressure regions for at least part of a stroke or cycle of a piston and cylinder assembly. It will be understood that the "front" of sealing ring assembly 920 refers to the face axially nearest high-pressure region 950, and the "rear" of sealing ring assembly 920 refers to the face axially nearest low-pressure region 970.

It will be understood that unless otherwise specified, all pressures referred to herein are in absolute units (e.g., not gage or relative).

It will be understood that high-pressure and low-pressure may refer to transient pressure states of a piston and cylinder device. For example, referencing an engine cycle, the high-pressure side of a sealing ring assembly may have a pressure greater than a low-pressure side of the sealing ring assembly for most of the engine cycle (e.g., except possibly during breathing or near-breathing portions of the cycle). Accordingly, high-pressure and low pressure are relative and depend on the conditions of the gas being sealed.

A sealing ring assembly may be used to seal a high pressure and a low-pressure region, each operating in any suitable pressure range. It will also be understood that a sealing ring assembly may seal differently at different positions in a cycle. It will be further understood that a low-pressure region may include a pressure greater than a pressure of a high-pressure region for some of a piston stroke or cycle of a piston and cylinder assembly. For example, a sealing ring assembly may always seal a high-pressure region from a low-pressure region. In a further example, a sealing ring assembly may seal a high-pressure region from a low-pressure region as long as the pressure in the high-pressure region is greater than the pressure in the low-pressure region. In a further example, a sealing ring assembly may seal a high-pressure region from a low-pressure region as long as the pressure in the high-pressure region is greater than the pressure in the low-pressure region, and conversely, seal a low-pressure region from a high-pressure region as long as the pressure in the low-pressure region is greater than the pressure in the high-pressure region.

In some embodiments, sealing ring assembly 920 may deposit material on bore 962 of cylinder 960 (e.g., include a self-lubricating material). Deposited material may lubricate the bore-to-sealing ring assembly interface between bore 962 and sealing ring assembly 920 (e.g., provide a dry lubricant). Accordingly, in some embodiments, piston and cylinder assembly 900 may operate without liquid for lubrication (e.g., oil).

In some embodiments, piston 926 may be an open-faced piston. For example, piston 926 may include openings, cutouts, or other fluid paths from high-pressure region 950 to ring groove 922. Accordingly, in some embodiments employing an open-faced piston, the radially inward surfaces (e.g., referencing radial direction R in FIG. 20) of sealing ring assembly 920 may be exposed to gas pressure of high pressure region 950.

Figure 21:
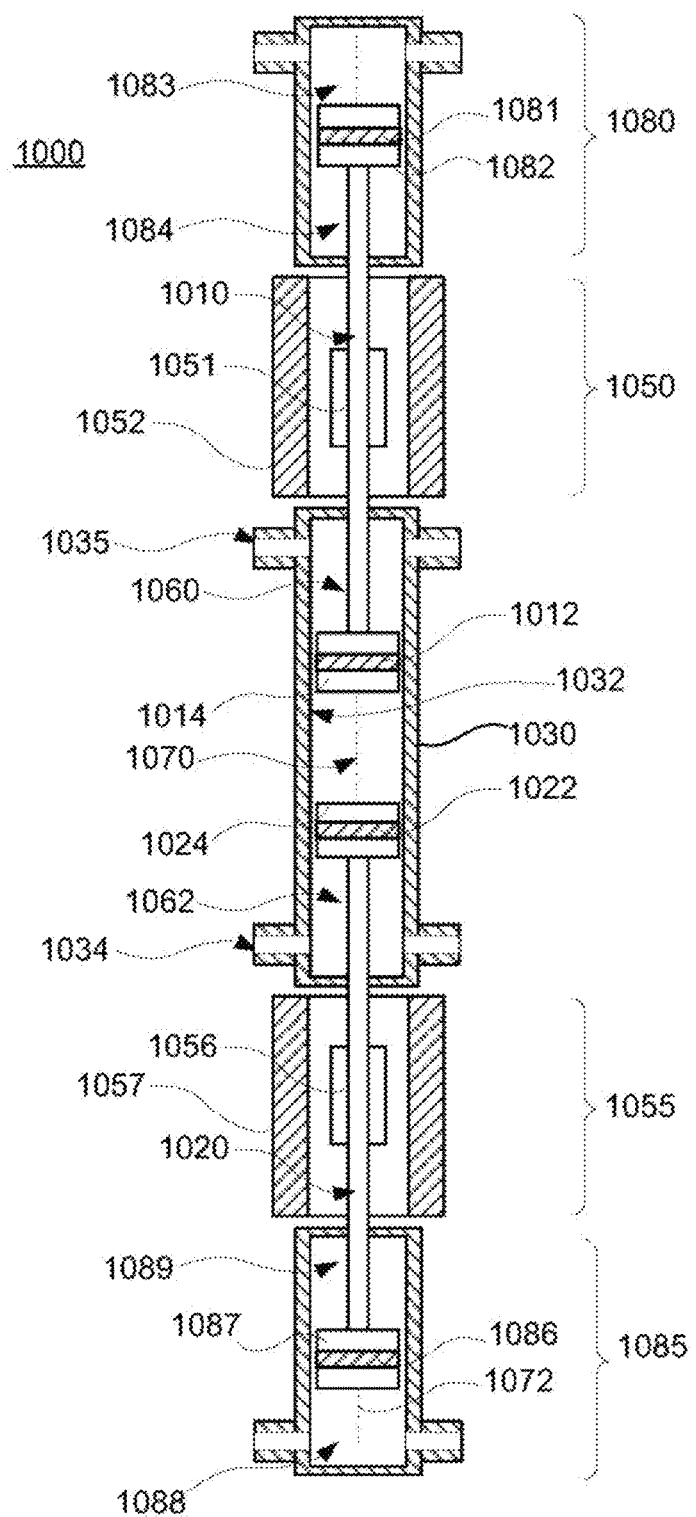
FIG. 21 shows a cross section view of an illustrative engine including two piston assemblies, that each include a sealing ring assembly in accordance with some embodiments of the present disclosure.

FIG. 21 shows a cross-sectional view of illustrative device 1000 including two free piston assemblies 1010 and 1020 that include respective sealing ring assemblies 1012 and 1022 in accordance with some embodiments of the present disclosure. In some embodiments, device 1000 may include linear electromagnetic machines 1050 and 1055 to convert between kinetic energy of respective free piston assemblies 1010 and 1020 and electrical energy. In some embodiments, device 1000 may include gas regions 1060 and 1062, which may, for example, be at a relatively lower pressure than gas region 1070 (e.g., a high-pressure region) for at least some, if not most, of a cycle (e.g., an engine cycle, or an air compression cycle). For example, gas regions 1060 and 1062 (e.g., low pressure regions) may be open to respective breathing ducting (e.g., an intake manifold, an intake system, an exhaust manifold, an exhaust system). To illustrate, breathing ports 1034 and 1035 are configured to provide reactants to, and remove exhaust from, bore 1032 of cylinder 1030. In a further example, gas regions 1060 and 1062 may be vented to atmosphere (e.g., be at about 1.01 bar absolute pressure). In some embodiments, device 1000 may include gas springs 1080 and 1085, which may be used to store and release energy during a cycle in the form of compressed gas (e.g., a driver section). For example, free piston assemblies 1010 and 1020 may each include respective pistons 1082 and 1087, having grooves for respective sealing ring assemblies 1081 and 1086, to seal respective gas regions 1083 and 1088 (e.g., high-pressure regions) from respective gas regions 1084 and 1089 (e.g., low-pressure regions).

Cylinder 1030 may include bore 1032, centered about axis 1072. In some embodiments, free piston assemblies 1010 and 1020 may translate along axis 1072, within bore 1032, allowing gas region 1070 to compress and expand. For example, gas region 1070 may be at relatively high pressure as compared to gas region 1060 for at least some of a stroke of free piston assemblies 1010 and 1020 (e.g., which may translate along axis 1072 in opposed piston synchronization). Sealing ring assemblies 1012 and 1022 may seal gas region 1070 from respective gas regions 1060 and 1062 within bore 1032. In some embodiments, free piston assemblies 1010 and 1020 may include respective pistons 1014 and 1024, and respective sealing ring assemblies 1012 and 1022 which may be arranged in respective corresponding grooves of pistons 1014 and 1024. It will be understood that gas regions 1060 and 1062, and gas region 1070, may change volume as free piston assemblies 1010 and 1020 move or are otherwise positioned at different locations along axis 1072. The portions of respective sealing ring assemblies 1012 and 1022 nearest gas region 1070 are each termed the front, and the portion of sealing ring assemblies 1012 and 1022 nearest respective gas regions 1060 and 1062 are each termed the rear. Sealing ring assemblies 1012 and 1022 may each include a high-pressure boundary, which may each depend on a pressure in gas region 1070. For example, a high-pressure boundary of sealing ring assembly 1012 may be open to gas region 1070 (e.g., coupled by one or more orifices, or other opening), and have a corresponding pressure the same as (e.g., if gas from gas region 1070 is unthrottled in the sealing ring assembly), or less than (e.g., if gas from gas region 1070 is throttled in the sealing ring assembly), the pressure of gas region 1070. Sealing ring assemblies 1012 and 1022 may each include a low-pressure boundary, which may depend on a gas pressure in respective gas regions 1060 and 1062. For example, a low-pressure boundary of sealing ring assembly 1012 may be open to gas region 1060 and have a corresponding pressure about the same as the pressure of gas region 1060.

In some embodiments, pistons 1014 and 1024 may each include one or more grooves into which one or more respective sealing ring assemblies may be arranged. For example, as shown in FIG. 10, pistons 1014 and 1024 may each include one groove, into which sealing ring assembly 1012 and sealing ring assembly 1022 may be installed, respectively. In a further example, although not shown in FIG. 21, piston 1014 may include two grooves, in which two respective sealing ring assemblies may be installed. In a further example, piston 1014 may include two grooves, the first sealing ring assembly 1012, and the second (not shown), arranged to the rear of sealing ring assembly 1012, but with its front nearer to gas region 1060, thereby sealing pressure in gas region 1060 to pressure between the two sealing ring assemblies (e.g., which may be less than pressure in gas region 1070). Accordingly, a sealing ring assembly may be used to seal any suitable high pressure and low-pressure regions from each other.

In some embodiments, free piston assemblies 1010 and 1020 may include respective magnet sections 1051 and 1056, which interact with respective stators 1052 and 1057 to form respective linear electromagnetic machines 1050 and 1055. For example, as free piston assembly 1010 translates along axis 1072 (e.g., during a stroke of an engine cycle), magnet section 1051 may induce current in windings of stator 1052. Further, current may be supplied to respective phase windings of stator 1052 to generate an electromagnetic force on free piston assembly 1010 (e.g., to effect motion of free piston assembly 1010).

In some embodiments, pistons 1014 and 1024, sealing ring assemblies 1012 and 1022, and cylinder 1030 may be considered a piston and cylinder assembly. In some embodiments, device 1000 may be an engine, an air compressor, any other suitable device having a piston and cylinder assembly, or any combination thereof. In some embodiments, device 1000 need not include two free piston assemblies. For example, cylinder 1030 could be closed (e.g., with a cylinder head), and free piston assembly 1010 alone may translate along axis 1072.

Figure 22:
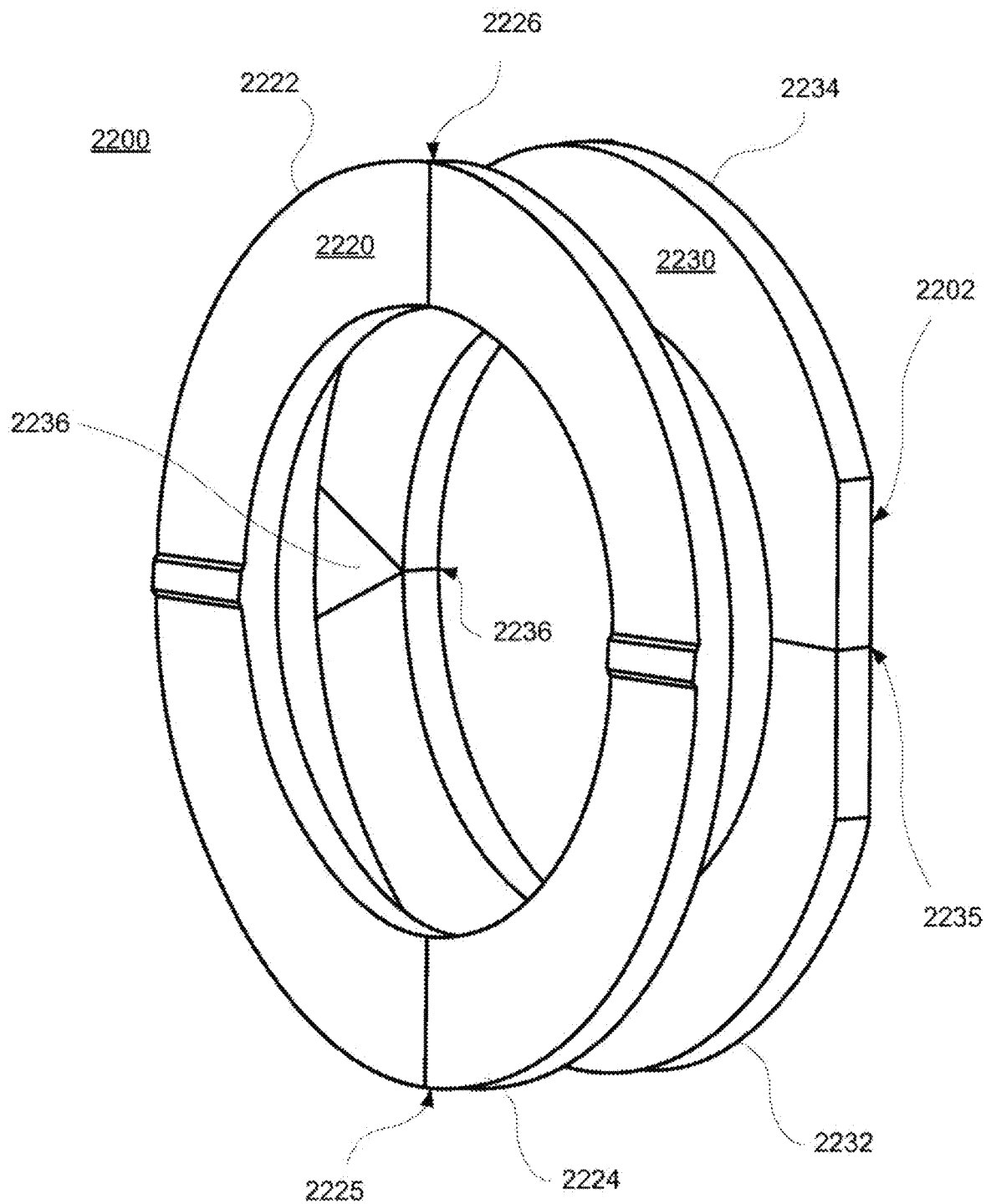
FIG. 22 shows an exploded perspective view of an illustrative sealing ring assembly, in accordance with some embodiments of the present disclosure.

FIG. 22 shows an exploded perspective view of illustrative sealing ring assembly 2200, in accordance with some embodiments of the present disclosure. Sealing ring assembly 2200 includes first ring 2220, second ring 2230, and gap cover element 2236. First ring 2220 includes first ring segments 2222 and 2224, which meet at interfaces 2225 and 2226 (e.g., there may be but need not be a gap). Second ring 2230 includes second ring segments 2232 and 2234, which include interfaces 2235 (e.g., flat planar interface) and 2236 (e.g., a wedge-shaped recess). Interfaces 2225 and 2226 do not align azimuthally with interfaces 2235 and 2236, thus preventing an axial leak path through azimuthally-aligned interfaces. Radially outside surface 2202 of second ring 2230 is configured to contact a corresponding integrated gap cover feature of a piston during operation, during assembly, when assembled, or a combination thereof. Although shown as extending azimuthally fully, or very nearly fully, 360 degrees, first ring 2220 need not extend the full circumference. For example, a first ring may include ring segments extending azimuthally just sufficient to cover a split in the second ring (e.g., a first ring may include ring segments with relatively large azimuthal gaps at the interfaces). During operation (e.g., sealing a high-pressure region from a low-pressure region), first ring 2220 is configured to seal axially against second ring 2230 and gap cover element 2236, as well as a bore of a cylinder. Second ring 2230 is configured to seal against a ring groove of a piston, a piston-integrated gap cover feature, gap cover element 2236, first ring 2220, and the bore.

Figure 23:
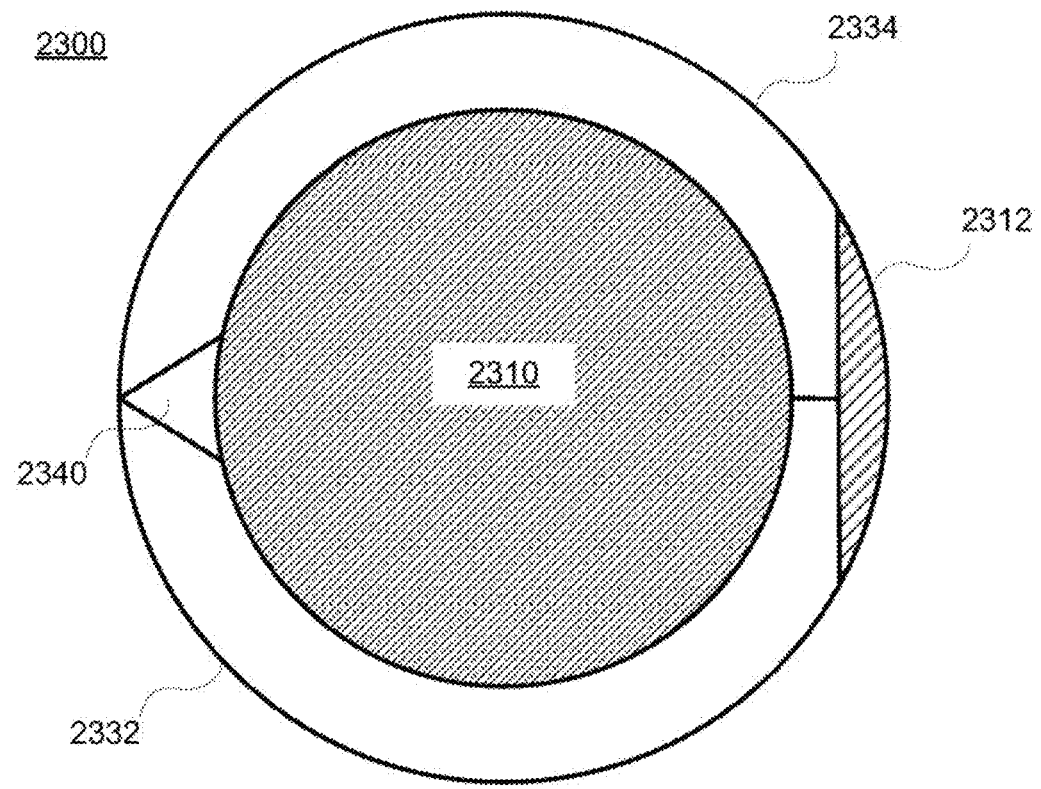
FIG. 23 shows a cross-sectional view of a portion of an illustrative piston, with a sealing ring assembly disassembled, in accordance with some embodiments of the present disclosure.
Figure 23:
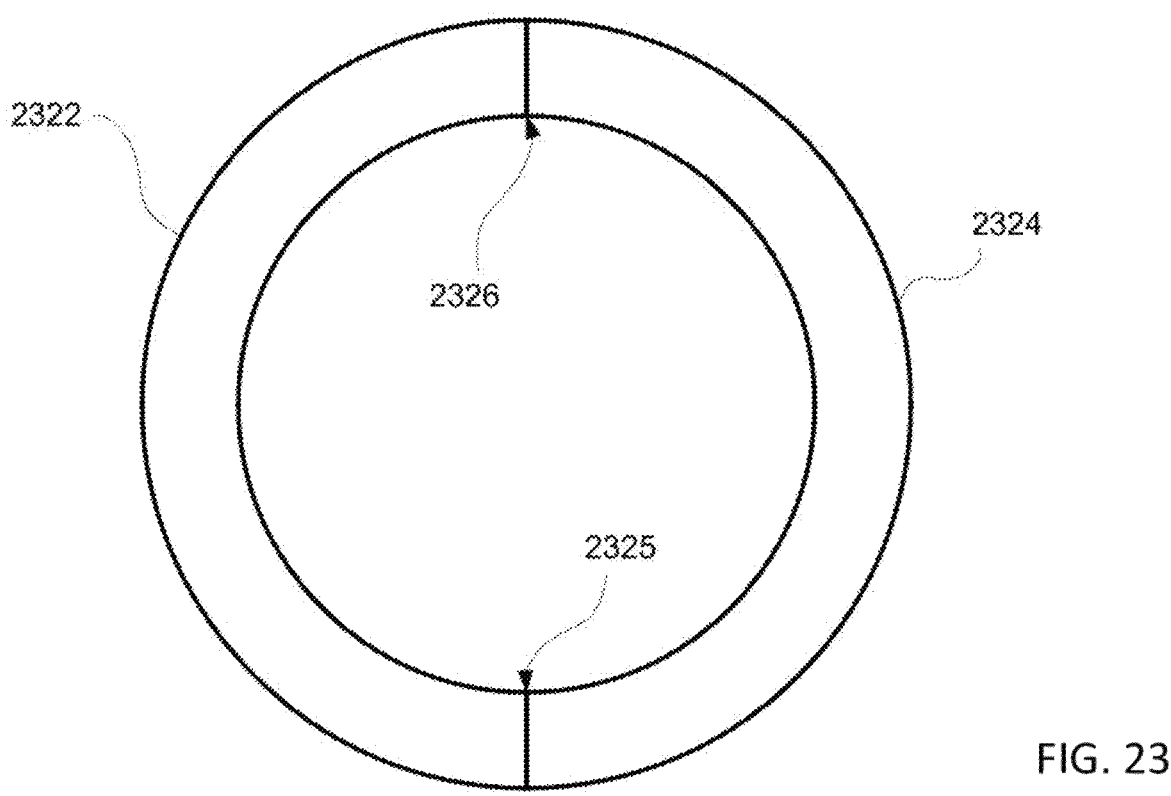

FIG. 23 shows a cross-sectional view (e.g., though a ring groove of piston 2310) of a portion of illustrative piston 2310, with a sealing ring assembly disassembled, in accordance with some embodiments of the present disclosure. The sealing ring assembly of FIG. 23 is similar to sealing ring assembly 2200 of FIG. 22, for example. Ring segments 2322 and 2324 constitute a first ring, ring segments 2332 and 2334 constitute a second ring. Gap cover element 2340 interfaces to ring segments 2332 and 2334 in the ring groove of piston 2310. The first ring is removed from the second ring in FIG. 23 for clarity. The first ring includes interfaces 2325 and 2326, that do not align azimuthally with interfaces of the second ring. Ring segments 2332 and 2334 are configured to seal against piston-integrated gap cover feature 2312. Ring segment 2324 is configured to seal axially against gap cover feature 2312. As shown illustratively in FIG. 23, gap-cover feature 2312 includes a circle segment-shaped cross section. For example, the boundary of the circle segment-shaped cross section includes a chord extending between two points on an outer radial surface of piston 2310, and an arc along the outer radial surface of piston 2310. A gap-cover feature may include any suitable cross-sectional shape, which may contact a section of a second ring, in accordance with the present disclosure.

A gap-cover feature (e.g., having a flat surface or otherwise) is rigidly attached to, or are part of, the piston when assembled (e.g., and do not move relative to the piston). In some embodiments, a gap-cover feature is a contiguous part of the piston such as, for example, a feature left over from machining or casting a ring groove into a piston billet. In some embodiments, a gap-cover feature is secured (i.e., affixed) to a piston using, for example, an adhesive, a weld (e.g., an ultrasonic weld, or a TiG weld), a braze joint, a fastener (e.g., via engaging mating threads), a pin (e.g., via press fitting), an interlocking interface, any other suitable securement, or any combination thereof. In an illustrative example, one or more gap-cover features may be retrofitted onto a piston of the prior art (e.g., along with any suitable modifications to a ring groove or piston face) in accordance with the present disclosure. In a further illustrative example, a piston may be created from one or more components, and one or more gap-cover features may be part of the one or more components, or components themselves.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors and free-piston compressors. In some embodiments, the present disclosure is applicable to gas springs. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, chemical ignition (e.g., exposure to a catalytic surface, hypergolic ignition), plasma ignition (e.g., spark ignition), thermal ignition, any other suitable energy source for ignition, or any combination thereof. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A sealing ring assembly comprising:
a sealing ring segment that extends axially from one side of the sealing ring assembly to an opposite side of the sealing ring assembly, the sealing ring segment comprising:
a first axial side that is wedge-shaped, and
a second axial side, opposite to the first axial side, that comprises a radially outer surface that is arc-shaped, wherein the first axial side is radially offset from the radially outer surface of the second axial side; and
a pair of additional ring segments, wherein:
each of the pair of additional ring segments comprise respective radially inward surfaces that interface with respective portions of a radially outward surface of the first axial side.

2. The sealing ring assembly of claim 1, wherein the radially outer surface of the second axial side and radially outer surfaces of each of the pair of additional ring segments are configured to seal against a wall.

3. The sealing ring assembly of claim 2, wherein the sealing ring segment comprises graphite.

4. The sealing ring assembly of claim 2, wherein during operation, the radially outer surface of the second axial side and the radially outer surfaces of each of the pair of additional ring segments seal against the wall due to radially outward forces.

5. The sealing ring assembly of claim 3, wherein as the radially outer surface of the second axial side and the radially outer surfaces of each of the additional ring segments wear, the offset decreases.

6. The sealing ring assembly of claim 1, wherein:
an azimuthal gap is formed between opposing ends of the pair of additional ring segments; and
the first axial side is configured to move radially outward to maintain a seal against a wall as the radially outer surfaces of the pair of additional ring segments wear during operation.

7. The sealing ring assembly of claim 1, wherein a radially inward surface, of the sealing ring assembly, comprised of radially inward sides of the sealing ring segment and the pair of additional ring segments is configured to be in contact with a low-pressure region.

8. The sealing ring assembly of claim 1, wherein the sealing ring assembly is configured to operate without a liquid lubricant.

9. A sealing ring segment comprising:
a first axial side that is wedge-shaped; and
a second axial side, opposite to the first axial side, that comprises a radially outer surface that is arc-shaped, wherein the first axial side is radially offset from the radially outer surface of the second axial side, and wherein the sealing ring segment is monolithic.

10. The sealing ring segment of claim 9, wherein the radially outer surface of the second axial side is configured to seal against a wall.

11. The sealing ring segment of claim 10, wherein the sealing ring segment comprises graphite.

12. The sealing ring segment of claim 11, wherein during operation, the radially outer surface of the second axial side seal against the wall due to radially outward forces.

13. The sealing ring segment of claim 12, wherein as the radially outer surface of the second axial side wears, the offset decreases.

14. The sealing ring segment of claim 11, wherein:
an azimuthal gap is formed between opposing ends of a pair of additional ring segments; and
the first axial side is configured to move radially outward to maintain a seal against a wall as the radially outer surfaces of the pair of additional ring segments wear during operation.

15. The sealing ring segment of claim 11, wherein a radially inward surface of the sealing ring segment is configured to be in contact with a low-pressure region.

16. The sealing ring segment of claim 11, wherein the sealing ring segment is configured to operate without a liquid lubricant.

17. A device comprising:
a cylinder comprising a bore;
a pistons comprising a circumferential groove that extends around an outer surface of the piston, wherein the pistons is to translate axially in the bore; and
a sealing ring assembly arranged in the circumferential groove, wherein the sealing ring assembly comprises:
a sealing ring segment that extends axially from one side of the sealing ring assembly to an opposite side of the sealing ring assembly, the sealing ring segment comprising:
a first axial side that is wedge-shaped, and
a second axial side, opposite to the first axial side, that comprises a radially outer surface that is arc-shaped, wherein the first axial side is radially offset from the radially outer surface of the second axial side; and
a pair of additional ring segments, wherein:
each of the pair of additional ring segments comprise respective radially inward surfaces that interface with respective portions of a radially outward surface of the first axial side.

18. The device of claim 17, wherein the radially outer surface of the second axial side and radially outer surfaces of each of the pair of additional ring segments are configured to seal against a wall.

19. The device of claim 18, wherein the sealing ring segment comprises graphite.

20. The device of claim 18, wherein during operation, the radially outer surface of the second axial side and the radially outer surfaces of each of the pair of additional ring segments seal against the wall due to radially outward forces.

21. The device of claim 18, wherein as the radially outer surface of the second axial side and the radially outer surfaces of each of the additional ring segments wear, the offset decreases.

22. The device of claim 17, wherein:
an azimuthal gap is formed between opposing ends of the pair of additional ring segments; and
the first axial side is configured to move radially outward to maintain a seal against a wall as the radially outer surfaces of the pair of additional ring segments wear during operation.

23. The device of claim 17, wherein a radially inward surface, of the sealing ring assembly, comprised of radially inward sides of the sealing ring segment and the pair of additional ring segments is configured to be in contact with a low-pressure region.

24. The device of claim 17, wherein the sealing ring assembly is configured to operate without a liquid lubricant.

\* \* \* \* \*